United States Patent [19]
Kihara et al.

[11] Patent Number: 5,559,712
[45] Date of Patent: Sep. 24, 1996

[54] THREE-DIMENSIONAL MODEL FORMING DEVICE

[75] Inventors: Tomohiko Kihara, Utsunomiya; Kentaro Furuhata, Ootawara; Noriyuki Iida, Tokyo, all of Japan

[73] Assignee: Kabushiki Kaisha Toshiba, Kawasaki, Japan

[21] Appl. No.: 427,656

[22] Filed: Apr. 21, 1995

Related U.S. Application Data

[63] Continuation of Ser. No. 121,911, Sep. 17, 1993, abandoned.

[30] Foreign Application Priority Data

Sep. 18, 1992 [JP] Japan .................................. 4-249914
Sep. 18, 1992 [JP] Japan .................................. 4-250164

[51] Int. Cl.$^6$ ................................................ G06F 159/00
[52] U.S. Cl. .............................. 364/468.25; 364/477.01
[58] Field of Search .......................... 364/413.19, 413.22, 364/468, 473, 476, 474.08, 474.24, 474.34, 477; 264/22, 25, 255; 365/119

[56] References Cited

U.S. PATENT DOCUMENTS

| | | | |
|---|---|---|---|
| 4,914,589 | 4/1990 | Crawford | 364/413.22 |
| 5,056,146 | 10/1991 | Neshide | 382/2 |
| 5,229,935 | 7/1993 | Yamagishi et al. | 364/413.22 |
| 5,357,429 | 10/1994 | Levy | 364/413.15 |

*Primary Examiner*—Donald E. McElheny, Jr.
*Attorney, Agent, or Firm*—Oblon, Spivak, McClelland, Maier, & Neustadt, P.C.

[57] ABSTRACT

This incudes means for forming tomographic images of multiple cross sections by subjecting a plurality of projection data items covering a three-dimensional area of an object to a re-construction process, means for converting the tomographic images of multiple cross sections into binary images of multiple cross sections by a threshold process, and means for forming a three-dimensional model by curing liquid resin based on an image area of the binary images of multiple cross sections. With the above construction, it is possible to form a three-dimensional model of a portion extracted by the threshold process from the plurality of projection data items covering the three-dimensional area of the object.

33 Claims, 22 Drawing Sheets

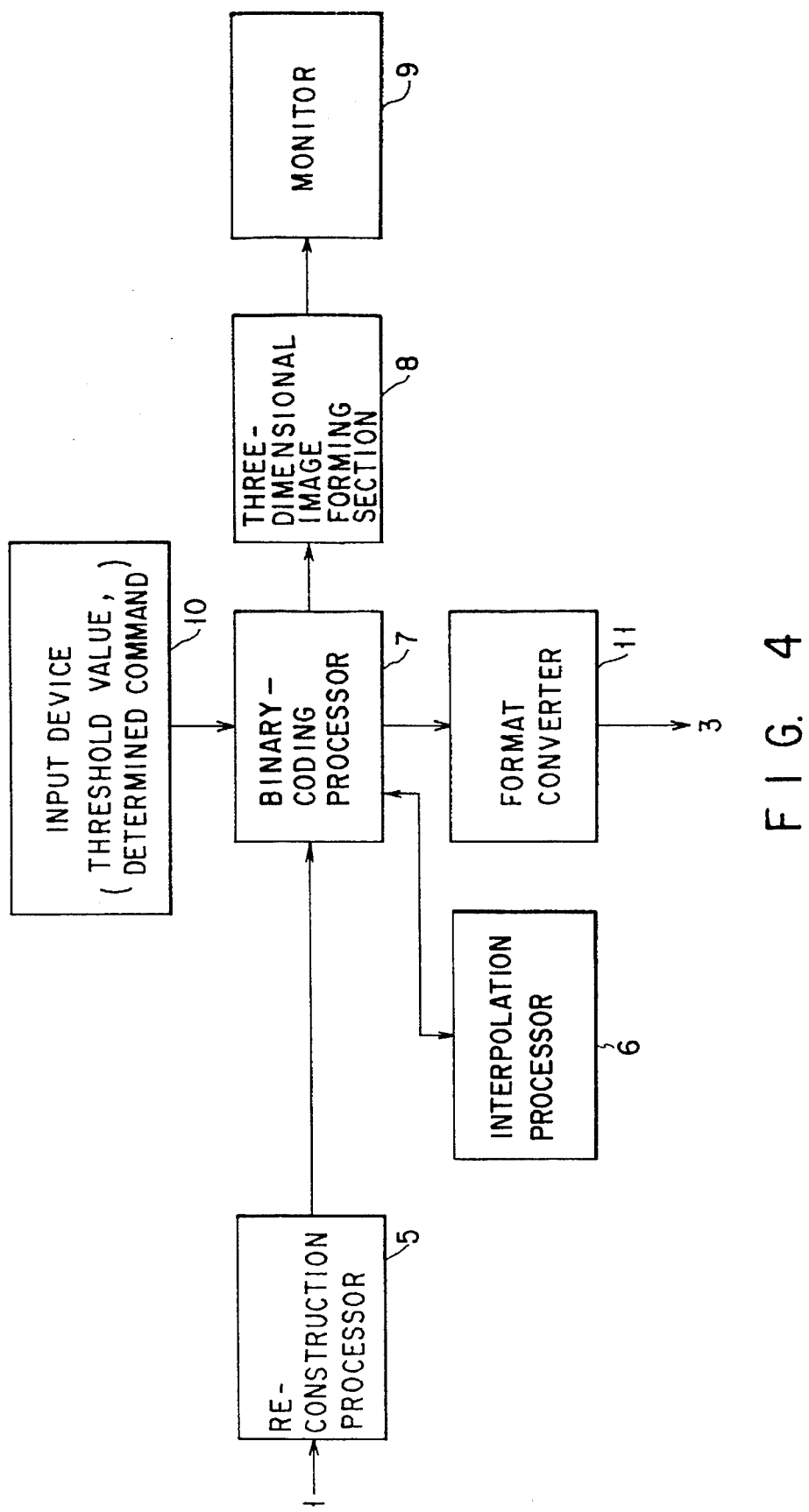
F I G. 4

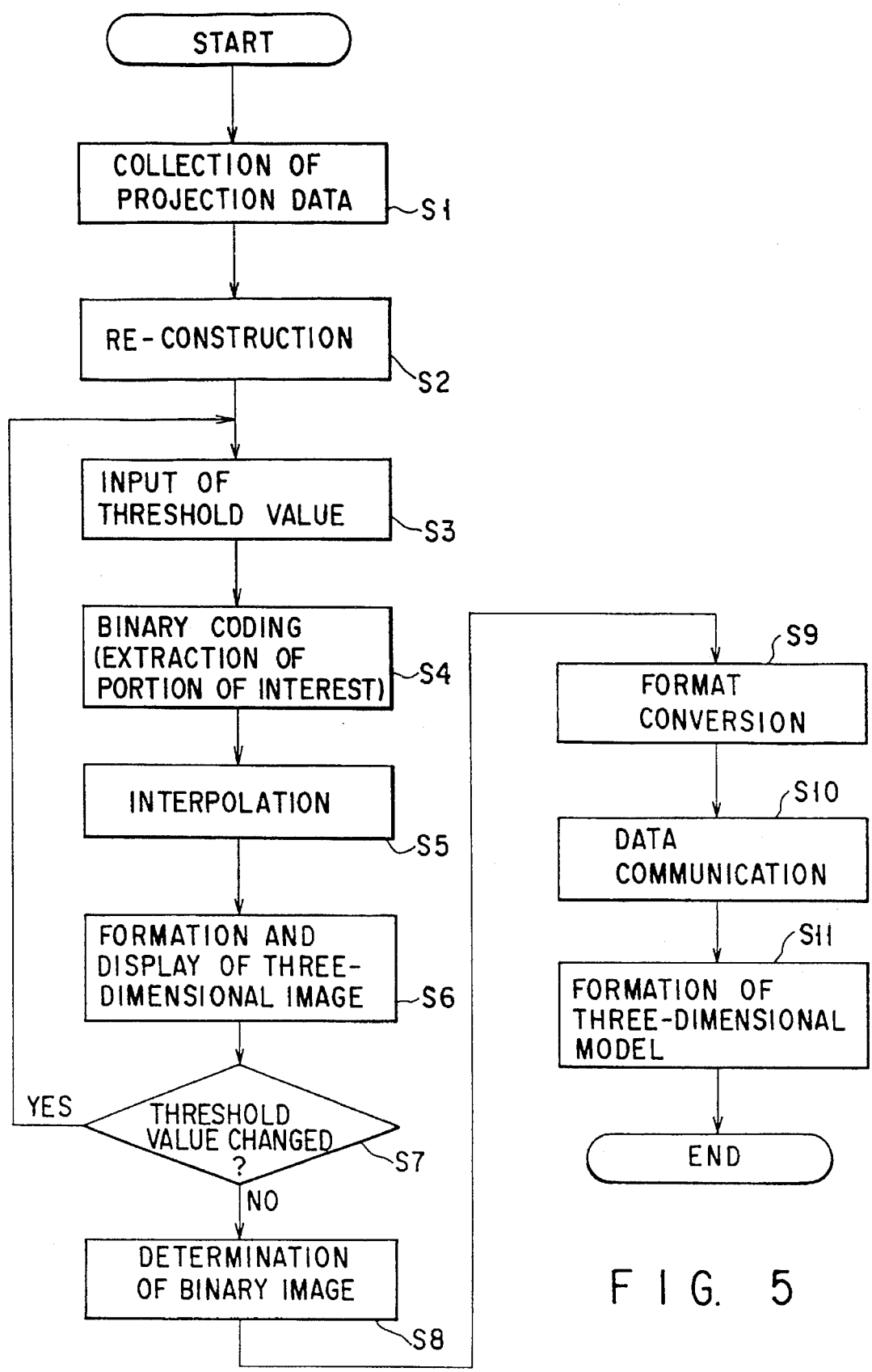
F I G. 5

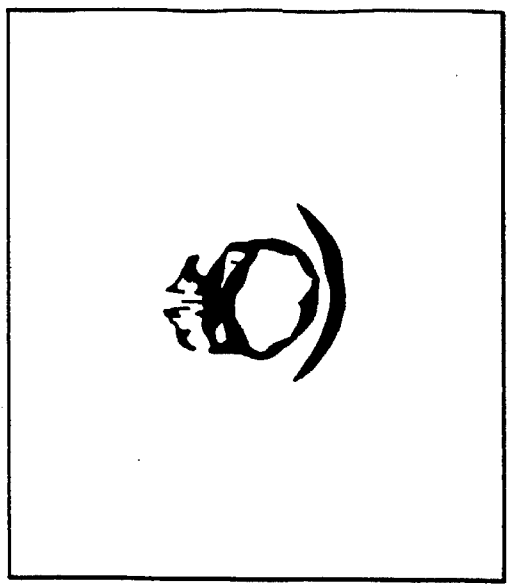
F I G. 7A
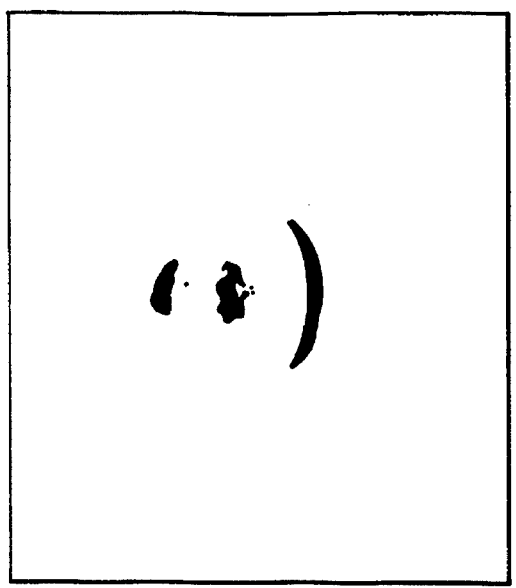
F I G. 7B
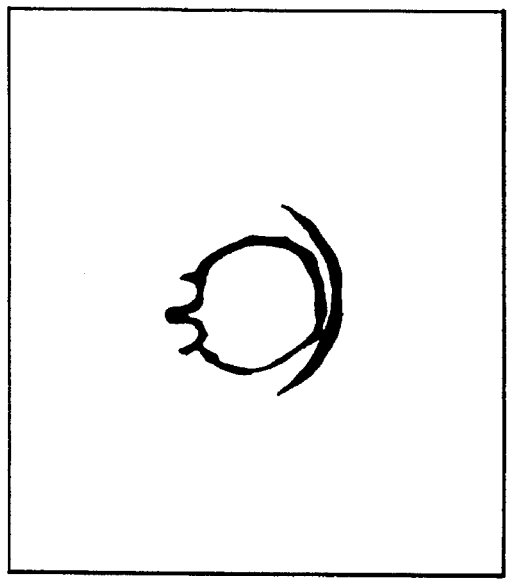
F I G. 7C
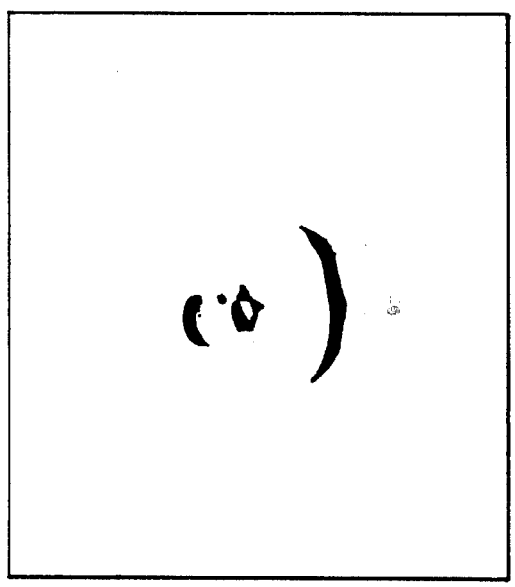
F I G. 7D

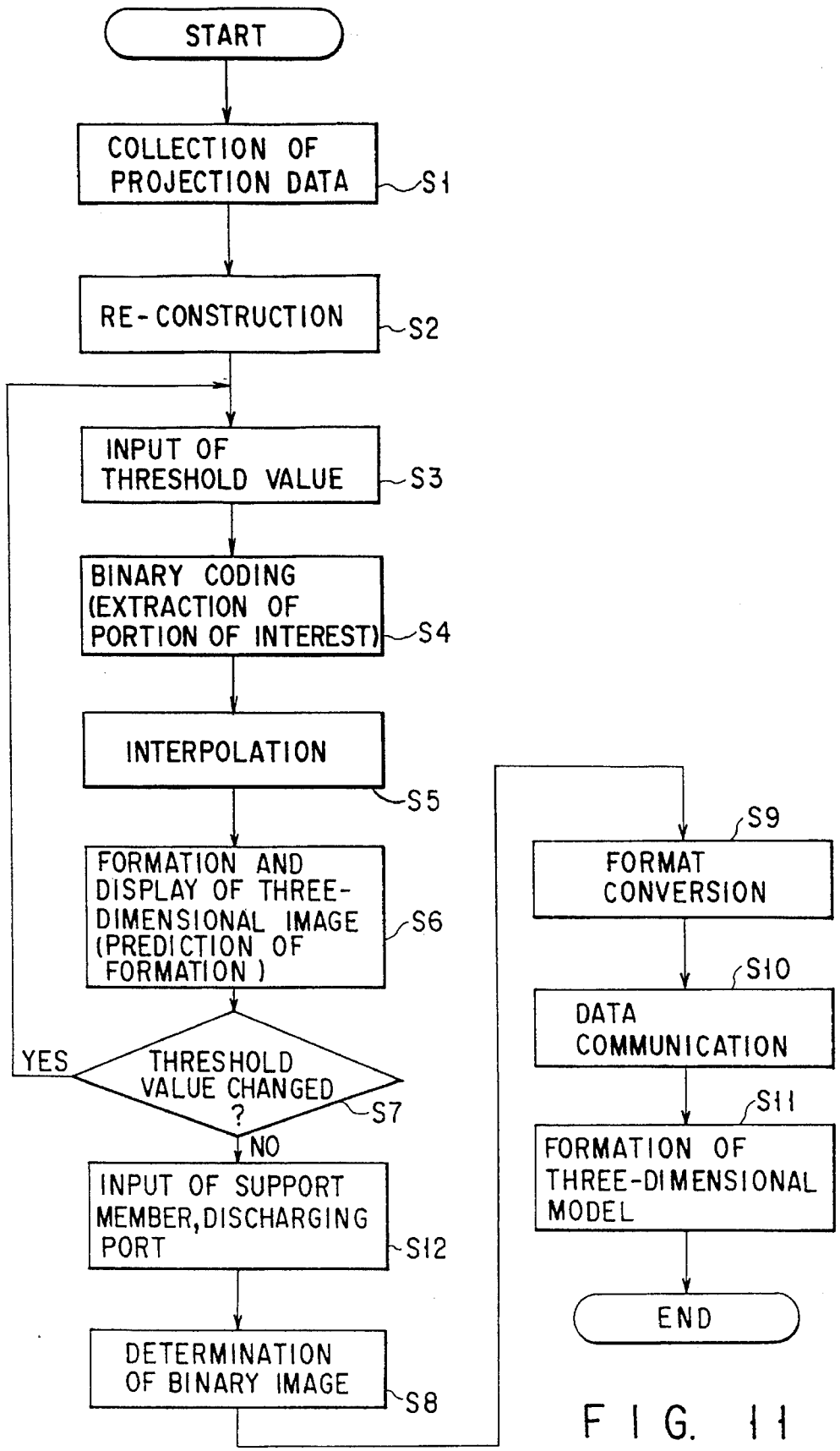
F I G. 11

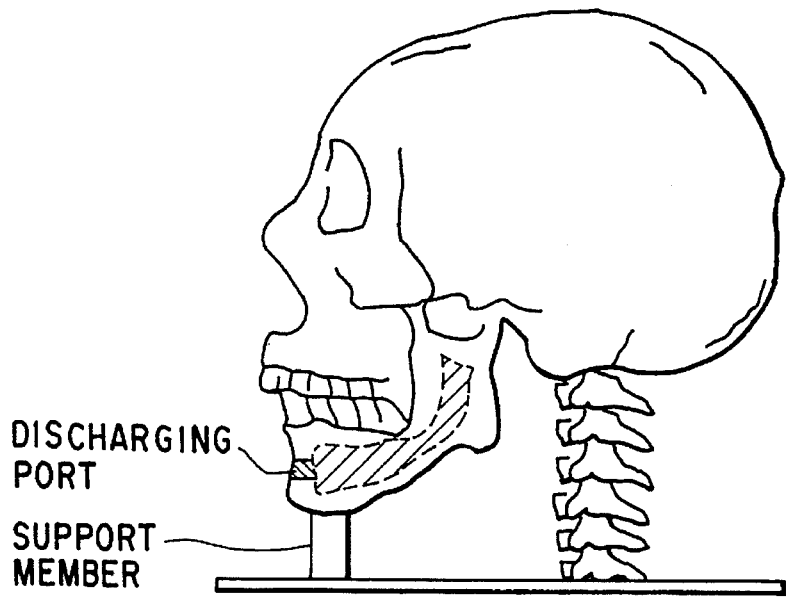
F I G. 12
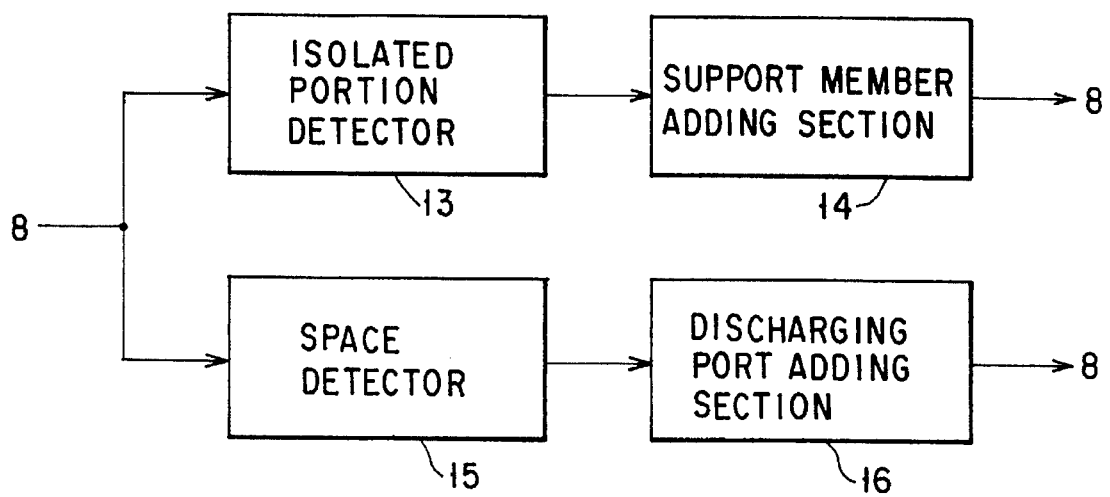
F I G. 14

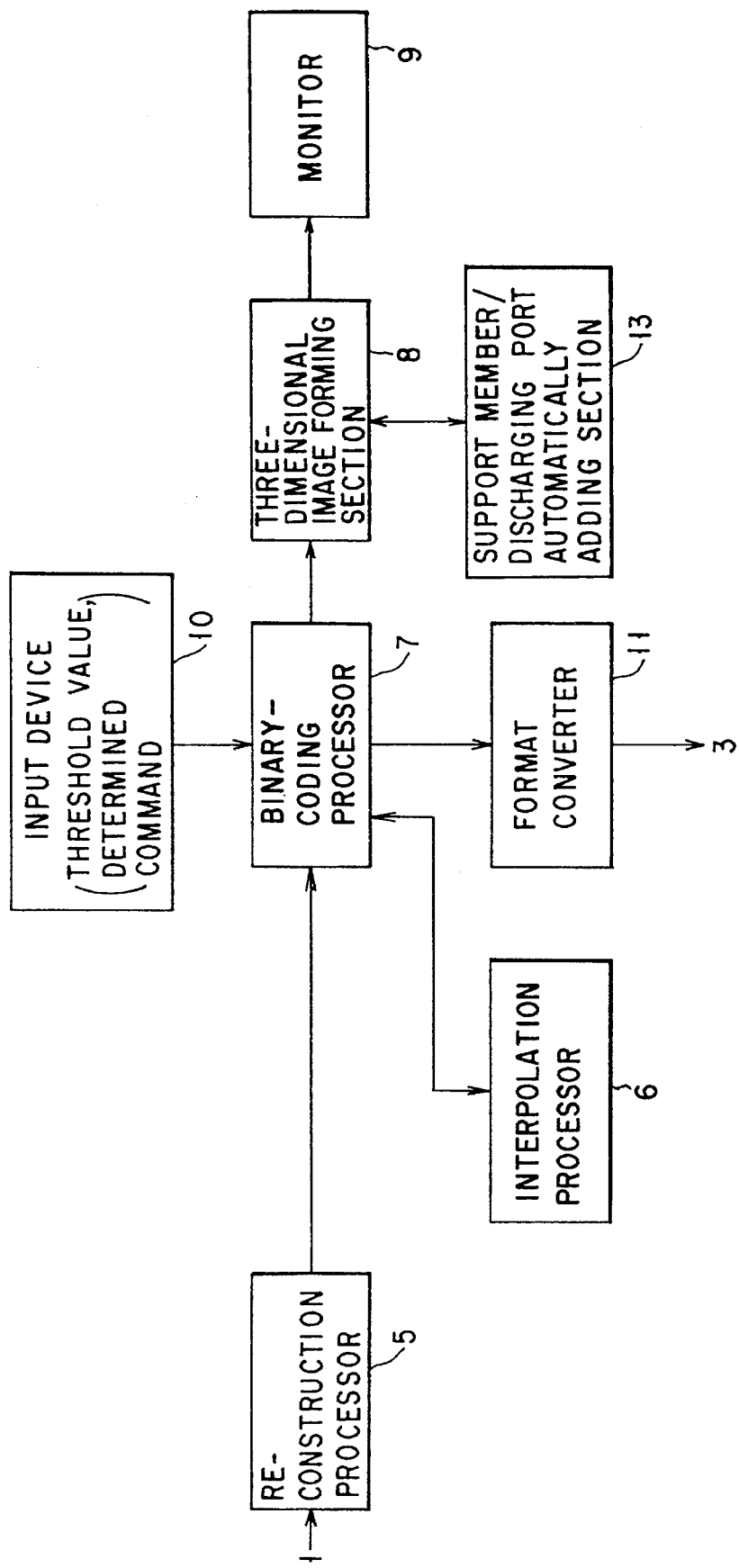
F I G. 13

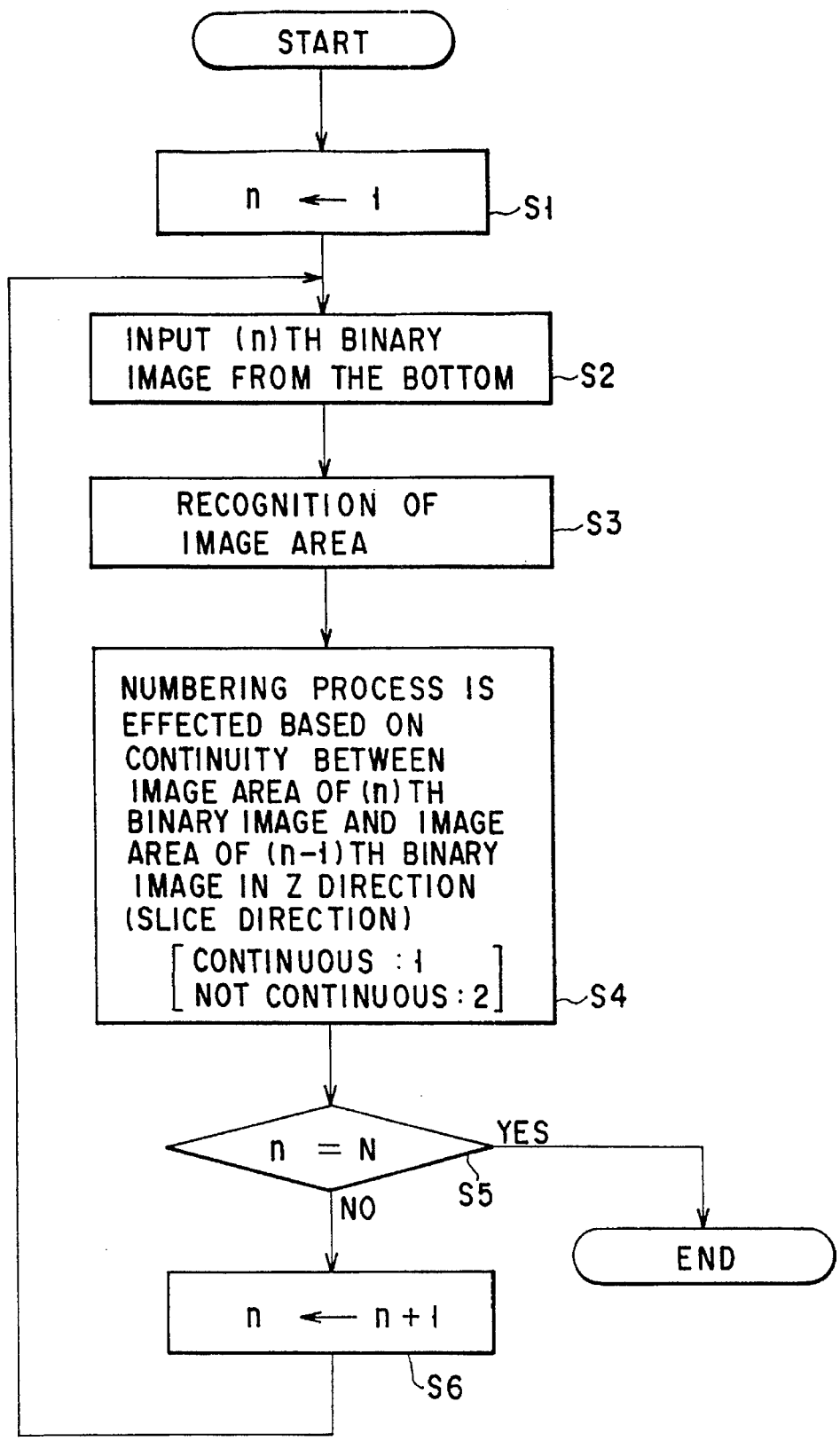
F I G. 15

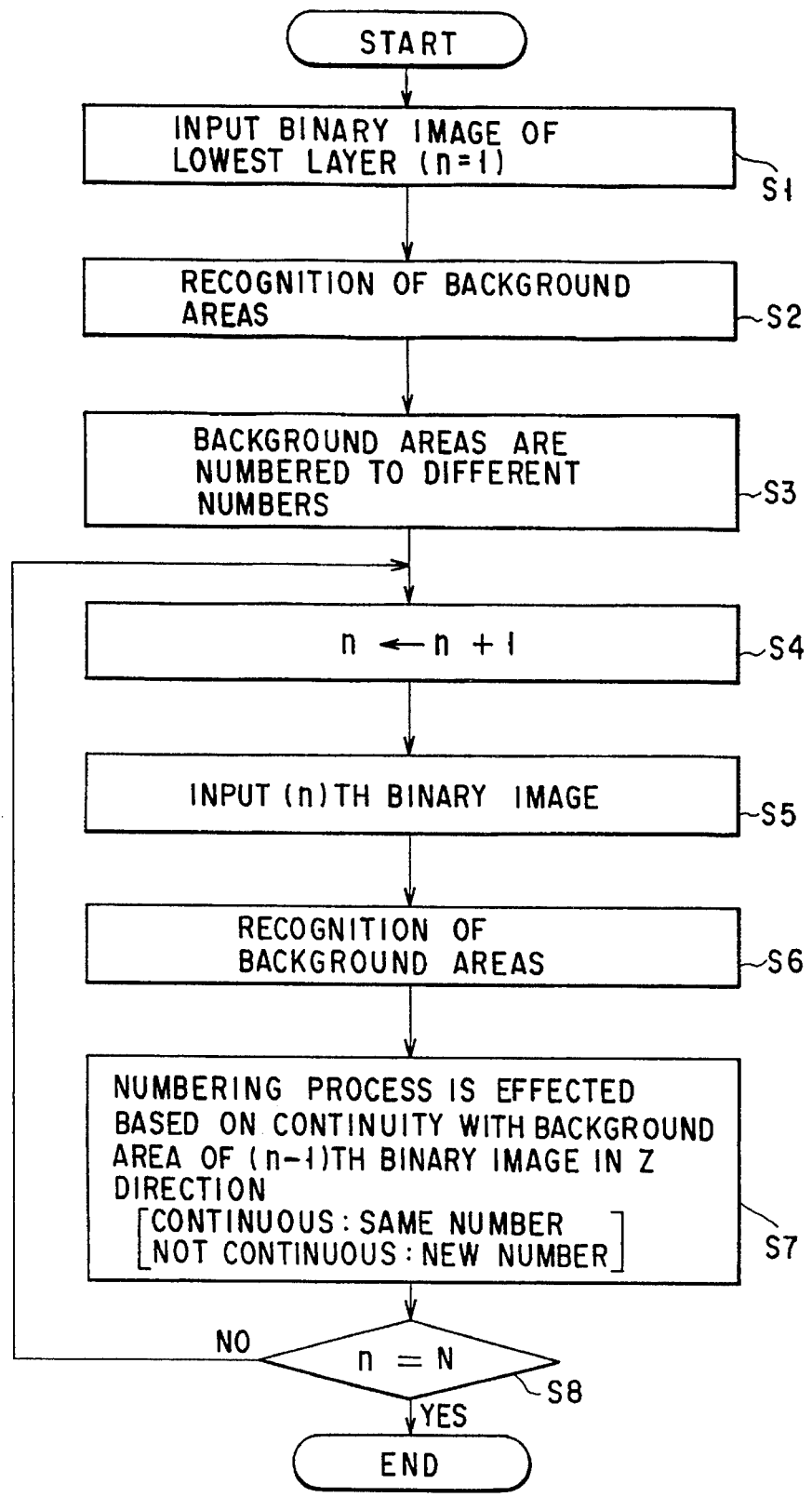
F I G. 17

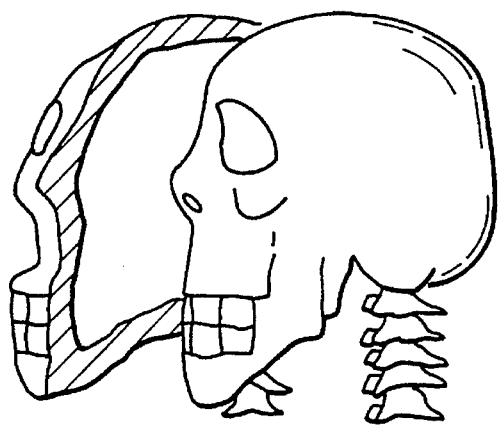
FIG. 24
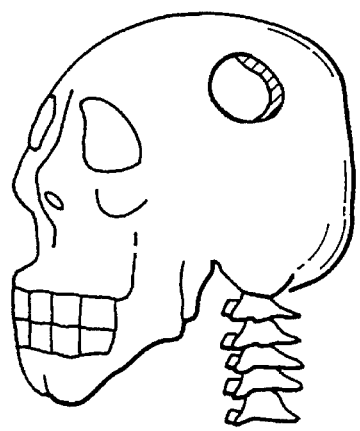 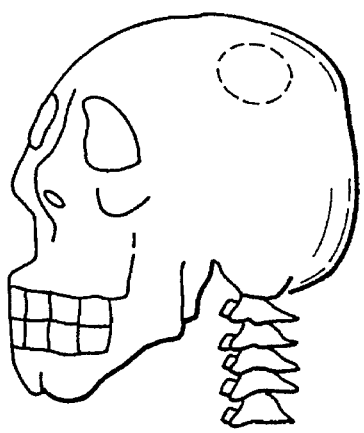
FIG. 25A    FIG. 25B
FIG. 25C

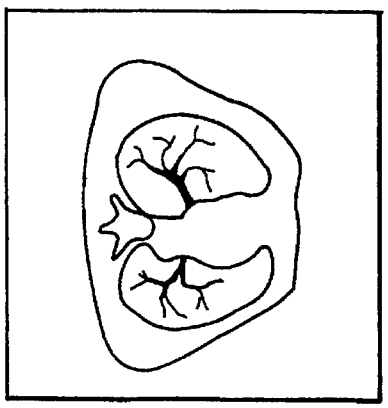
F I G. 27A
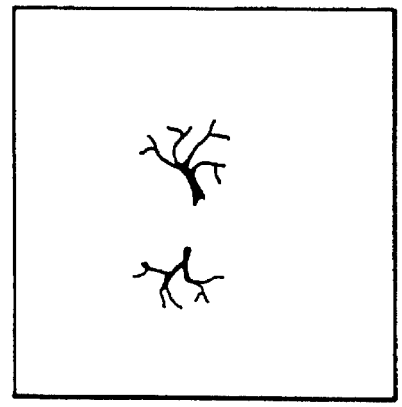
F I G. 27B
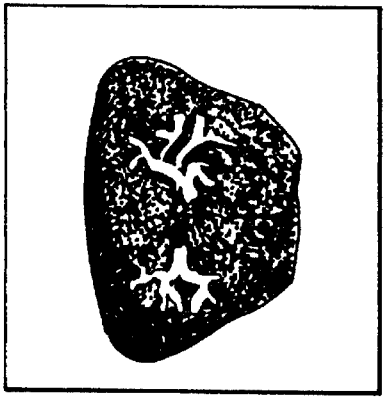
F I G. 27C
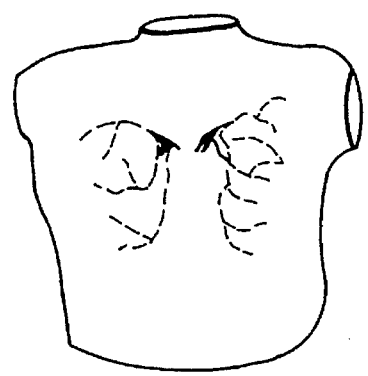
F I G. 27D

THREE-DIMENSIONAL MODEL FORMING DEVICE

This application is a Continuation of U.S. patent application Ser. No. 08/121,911, filed on Sep. 17, 1993, now abandoned.

BACKGROUND OF THE INVENTION

1. Field of the Invention

This invention relates to a three-dimensional model forming device for forming a three-dimensional plastic model.

2. Description of the Related Art

A surgical operation previously requires planning for the operation plan. The procedure of cutting or extraction is determined according to the operation plan.

At present, the operation planning is often effected by use of a three-dimensional computer graphic device called an operation simulation system. The operation simulation system is supplied with three-dimensional data collected by a tomography apparatus such as an X-ray computer tomography apparatus or magnetic resonance imaging apparatus. A three-dimensional image of an area of interest is created based on the three-dimensional data. The three-dimensional image is displayed on a monitor. While observing the three-dimensional image, the operator simulates the actual operation by use of computer processings such as cutting, cutting-off and measurement.

However, the above simulation did not satisfy the surgeons. This is because all of the surgical treatments such as cutting, cutting-off and measurement are effected for the three-dimensional image on the monitor.

SUMMARY OF THE INVENTION

An object of this invention is to provide a three-dimensional model forming device capable of forming a solid or three-dimensional model.

The three-dimensional model forming device according to this invention comprises a three-dimensional model forming device comprising means for forming tomographic images of multiple cross sections by subjecting a plurality of projection data items covering a three-dimensional area of an object to a re-construction process, means for converting the tomographic images of multiple cross sections into binary images of multiple cross sections by a threshold process and means for forming a three-dimensional model by curing liquid resin based on an image area of the binary images of multiple cross sections. With this three-dimensional model forming device, the three-dimensional model of a desired portion of an object can be formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing a model data creating device of FIG. 1;

FIG. 5 is a flowchart showing the operation procedure of the three-dimensional model forming device of FIG. 1;

FIGS. 7A to 7D are examples of binary images;

FIG. 11 is a flowchart showing the operation procedure of the three-dimensional model forming device of the second embodiment;

FIG. 12 is a view showing a support member and a discharging port;

FIG. 13 is a block diagram showing a model data creating device of a three-dimensional model forming device according to a third embodiment;

FIG. 14 is a block diagram showing a support member/discharging port adding section of FIG. 13;

FIG. 15 is a flowchart showing the operation procedure of a support member detecting section of FIG. 14;

FIG. 17 is a flowchart showing the operation procedure of a discharging port detecting section of FIG. 14;

FIG. 24 is an external view of a three-dimensional model modeled by the other separation process;

FIGS. 25A to 25C are supplementary diagrams for explaining the lateral inversion process by the image processor;

FIGS. 27A to 27D are supplementary diagrams for explaining a specified area extraction process by the image processor of FIG. 26.

DETAILED DESCRIPTION OF THE PREFERRED EMBODIMENTS

There will now be described an embodiment of this invention with reference to the accompanying drawings.

Figure 1:
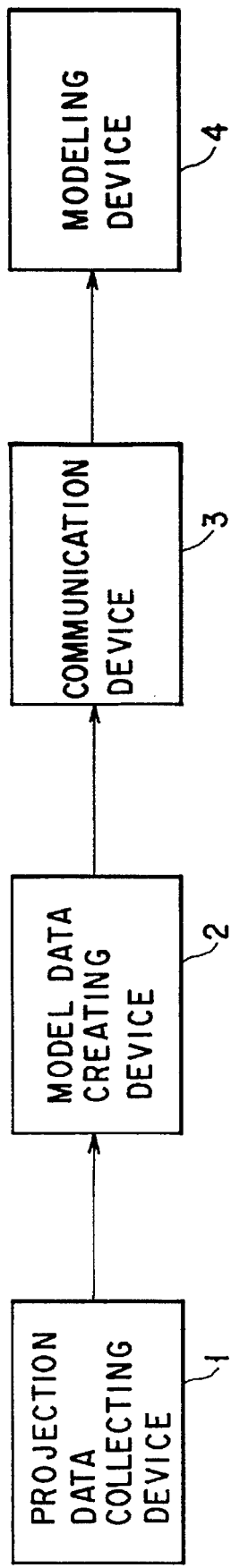
FIG. 1 is a block diagram showing a three-dimensional model forming device according to a first embodiment.

FIG. 1 is a block diagram showing the construction of a three-dimensional model forming device according to a first embodiment. An output of a projection data collecting device 1 is connected to a model data creating device 2 whose output is connected to a modeling device 4 via a communication device 3.

The projection data collecting device 1 is an X-ray computer tomography device or magnetic resonance imaging device. In this example, it is assumed that the projection data collecting device 1 is an X-ray computer tomography device. The X-ray computer tomography device may be an intermittent scanning type for collecting projection data of multiple cross sections by intermittently moving a roof on which an object is mounted by a preset pitch (slice pitch) for each rotation of an X-ray tube or a helical scanning type for collecting continuous projection data along a helical track by continuously moving a roof on which an object is mounted while the X-ray tube is continuously rotated.

Figure 2A:
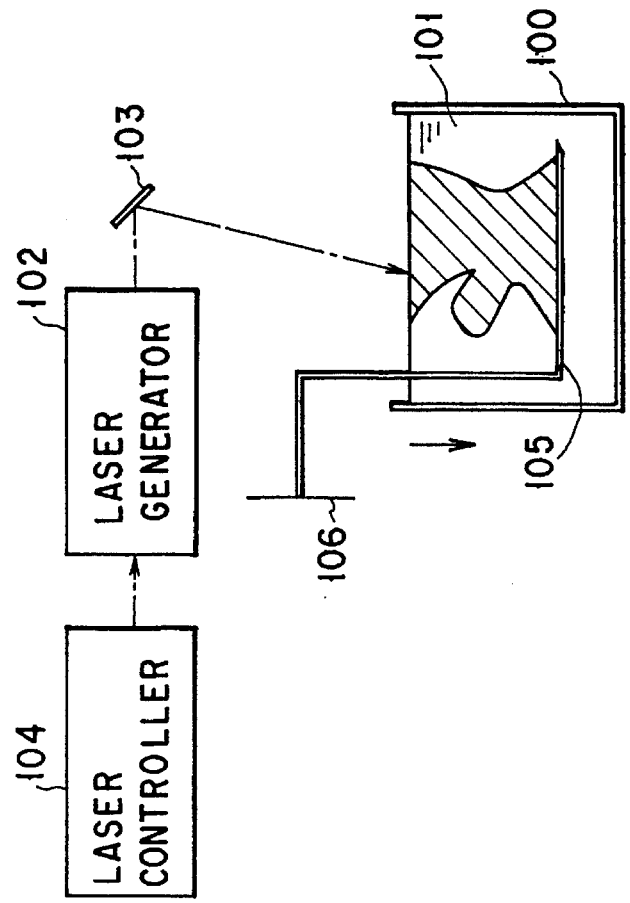
FIG. 2A is a diagram showing the schematic structure of the modeling device of FIG. 1.
Figure 3:
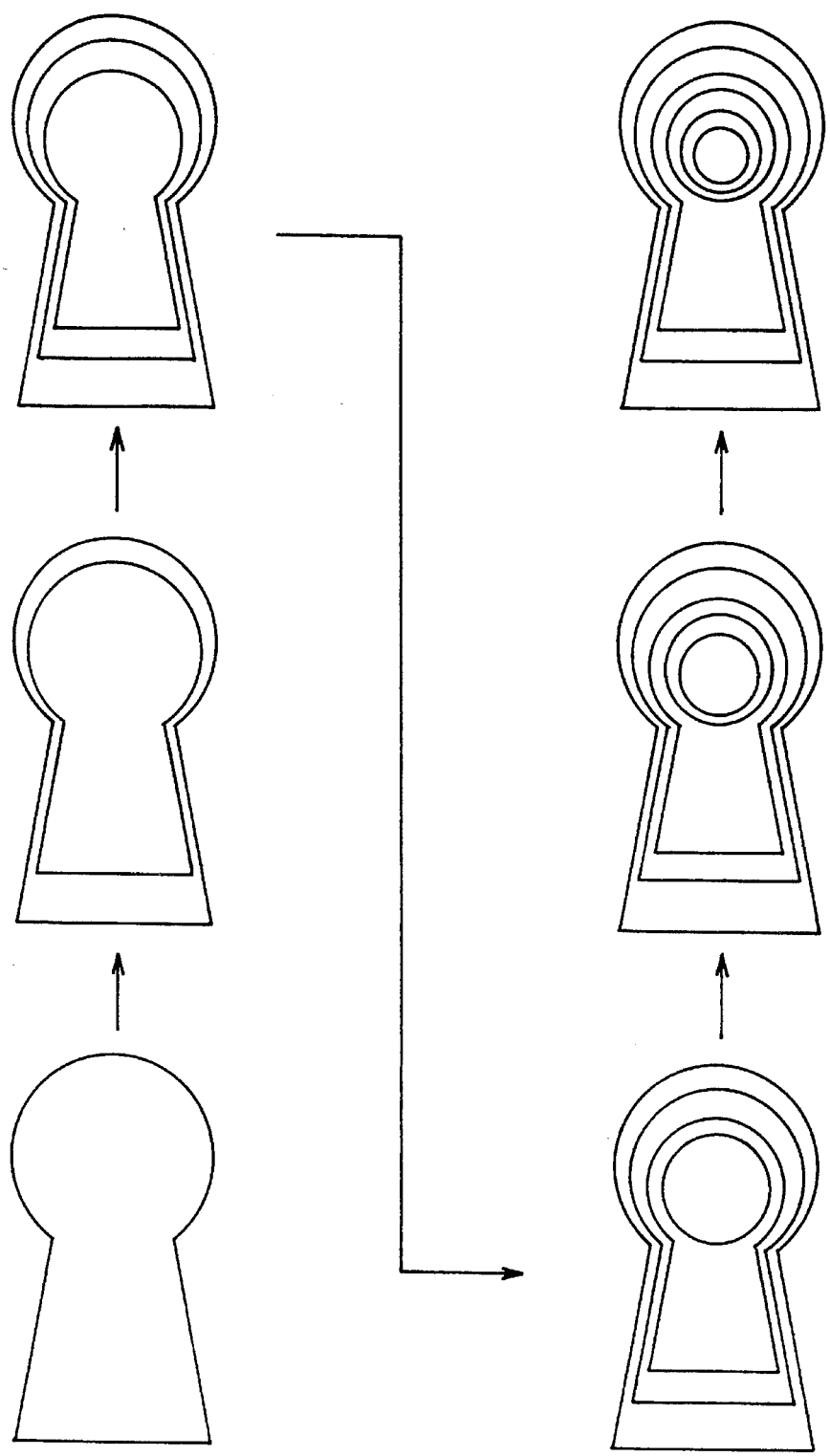
FIG. 3 is a diagram showing the modeling principle of the modeling device.

FIG. 2A is a schematic construction diagram of the modeling device 4. Liquid ultraviolet curing resin 101 is filled in a water tank 100. The liquid ultraviolet curing resin 101 has a property that it is set when applied with ultraviolet light. A pin-point ultraviolet laser beam from a laser generator 102 is applied to the liquid surface via a mirror 103. A laser controller 103 is supplied with a binary image from the exterior. The binary image is temporarily stored in a memory in the laser controller 103 and then read out from the memory as a linear series of pixels at a constant speed. Light emission of the laser generator 102 is controlled according to the level of readout data. When the readout data is "1", a laser beam is emitted from the laser generator 102 and when the readout data is "0", no laser beam is emitted. The mirror 102 is supported by a mirror supporting mechanism (not shown). The mirror supporting mechanism inclines the mirror 10B to the optical axis of the laser beam in synchronism with the readout of a series of pixels. Thus, the liquid surface of the ultraviolet curing resin 101 is scanned by the laser beam. Part of the resin which is applied with the laser beam is cured and part of the resin which is not applied with the laser beam is not cured. Therefore, the cured portion corresponds to the image area of the binary image. When the curing operation for one layer is completed, a base plate 105 is lowered by a small lowering pitch by use of an elevator 106. The curing operation and lowering operation are repeatedly effected for all of the binary images to sequentially laminate cured layers one by one as shown in FIG. 3. Thus, a three-dimensional plastic model is formed.

Figure 2B:
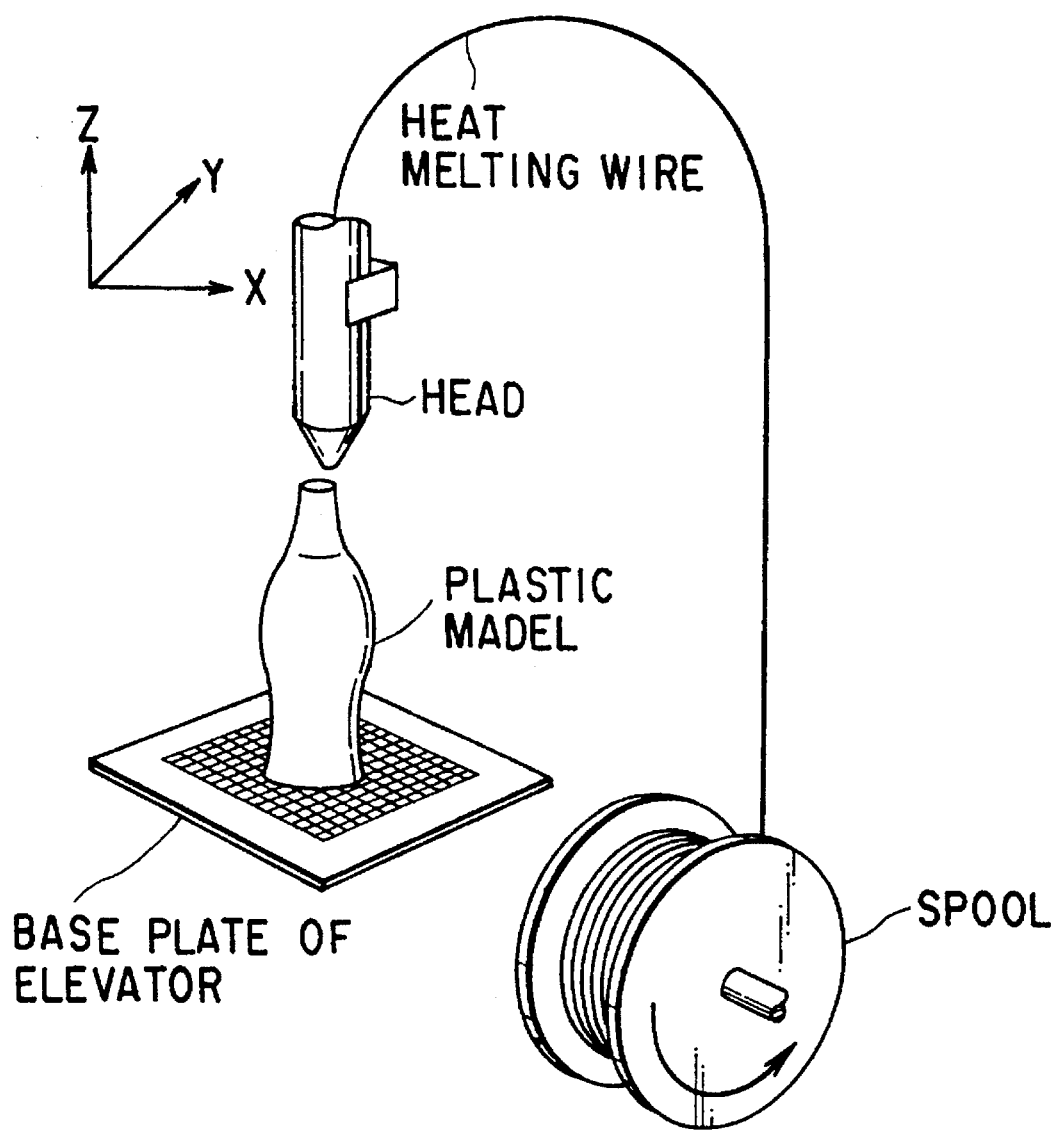
FIG. 2B is a diagram showing the other schematic structure of the modeling device of FIG. 1.

FIG. 2B shows another type of a modeling device 4. As shown in FIG. 2B, a length of heat melting wire made of ABS resin, vinyl, or wax is fed from a spool to a head. The head applies heat to the wire, melting the same, and supplies the molten material. The head is attached to a holding mechanism. The holding mechanism is controlled by a controller to move the head in an XY plane under the control of a controller. The head is also controlled by the controller to supply the molten material and stop supplying the same. The controller controls the head in accordance with binary data it is obtaining obtained by scanning the tomographic images of a mode. In other words, the controller controls both the head and the holding mechanism, while scanning the tomographic images. A number of slice models are placed, one upon another, on the base plate of an elevator. Needless to say, the base plate is lowered, for a predetermined pitch, every time slice model is put on the uppermost of the slice models already mounted on the base plate.

FIG. 3 is a block diagram showing the construction of the model data creating device 2. Projection data collected by the projection data collecting device 1 is supplied to a re-construction processor 5. The re-construction processor 5 creates tomographic images of multiple cross sections by subjecting the projection data to the re-construction process. If the projection data collecting device 1 is a helical scanning type X-ray computer tomography device, tomographic images of desired cross sections can be re-constructed based on collected projection data so that the re-construction processor 5 may construct tomographic images of multiple cross sections at a pitch corresponding to the lowering pitch of the modeling device 4.

The tomographic images of multiple cross sections are supplied to a binary-coding processor 7 and converted into binary images. Thus, a portion of interest such as bone which is desired to be formed as a three-dimensional model is extracted. A threshold value for the binary coding is set by an input device 10. It is desired to set the threshold value for each binary image or for every several binary images by the input device 10. The CT value of a small bone such as the bottom of the eye-socket tends to be lowered by an influence of small CT values of the surrounding tissues. The tendency is generally called partial volume effect. Therefore, extraction of a small bone such as the bottom of the eye-socket is effected by setting the threshold value more precisely than that of the other tomographic image.

In general, the lowering pitch of the modeling device 4 is smaller than the slice pitch of the projection data collecting device 1. In order to set the slice pitch equal to the lowering pitch, the interpolation processor 6 creates a new binary image or images between the adjacent binary images by the interpolation process. Of course, the interpolation process is not effected when the slice pitch of the tomographic images of multiple cross sections output from the re-construction processor 5 is equal to the lowering pitch.

The binary images of multiple cross sections created by the binary-coding processor 7 are supplied to a three-dimensional image forming section 8. The three-dimensional image forming section 8 forms a three-dimensional image based on the binary images of multiple cross sections. The three-dimensional image is displayed on a monitor 9. The three-dimensional image is a conceptional drawing of a three-dimensional model at its completion finally created by the modeling device 4. If the portion of interest is not correctly extracted, the threshold value is changed by means of the input device 10. If the portion of interest is correctly extracted, a determined command is input by means of the input device 10.

The determined binary images of multiple cross sections are supplied to a format converter 11. The format converter 11 converts each of the binary images into an image of real sizes and converts the binary image into an image of a format which can be processed by the modeling device 4. Thus, model data can be created.

Model data items of multiple cross sections are supplied to the modeling device 4. As the communication device 3, a communication medium of large capacity such as an optical fiber is desirably used. Further, as the communication device 3, a portable medium such as a floppy disk, magnetic tape, optical disk, IS&C photoelectro-magnetic disk may be used. When the portable medium is used as the communication device 3, advantages that the degree of freedom of selection of the place in which the modeling device 4 is installed increases and the modeling device 4 can be commonly used by a plurality of model data creating devices 2 can be attained.

Next, the operation is explained. A case wherein the three-dimensional model of a scull is formed is explained as an example.

FIG. 5 is a flowchart showing the entire operation procedure from collection of projection data to formation of the three-dimensional model.

In the step (S1), projection data of the scull of an object for all of the multiple cross sections is collected by the projection data collecting device 1. In the step (S2), projection data collected by the projection data collecting device 1 is subjected to the re-construction process by the re-construction processor 5. As a result, tomographic images of multiple cross sections are created. If the projection data collecting device 1 is a helical scanning type X-ray computer tomography device, tomographic images of multiple cross sections are created at a pitch equal to the lowering pitch of the modeling device 4 by the re-construction processor 5.

The tomographic images of multiple cross sections are supplied to the binary-coding processor 7.

In the step (S3), the threshold value for binary coding is precisely set foe each tomographic image or foe every several binary images by the input device 10. Then, in the step (S4), each of the tomographic images is converted into a binary image according to the threshold value by means of the binary-coding processor 7. Thus, a scull image which is desired to be obtained in the form of three-dimensional model can be extracted. Since the threshold value is precisely set, the partial volume effect can be suppressed and an image of a small bone such as the bottom of the eye-socket can be extracted in good conditions.

In the step (S5), a new binary image or images are created between adjacent binary images by the interpolation processor 6 in order to set the slice pitch equal to the lowering pitch of the modeling device 4. When projection data is previously collected at a slice pitch equal to the lowering pitch of the projection data collecting device 1 and if tomographic images of multiple cross sections with a slice pitch equal to the lowering pitch are created by the re-construction processor 5, the interpolation process is not effected.

Figure 6:
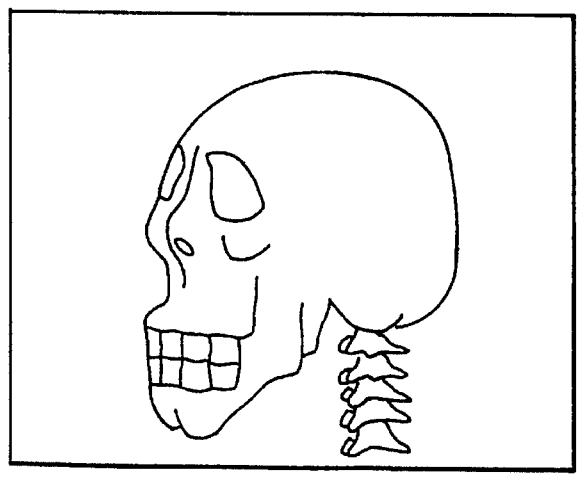
FIG. 6 is a diagram showing an example of a three-dimensional image displayed on a monitor of FIG. 1.

In the step (S6), binary images of multiple cross sections are converted into a three-dimensional image by the three-dimensional image forming section 8. The three-dimensional image is displayed on the monitor 9 (FIG. 6). The three-dimensional image is a conceptional drawing of a three-dimensional model at its completion finally created by the modeling device 4. Therefore, the operator can previously observe the three-dimensional model. When the portion of interest is not correctly extracted in the step (S7), the process is returned to the step (S4) and a sequence of operations from the step (S4) to the step (S7) is repeatedly effected. That the threshold value is changed by operating the input device 10. Binary images are created based on the threshold value. The binary images are converted into a three-dimensional image. The three-dimensional image is displayed on the monitor 9. On the other hand, if the portion of interest is correctly extracted in the step (S7), a determined command is input by operating the input device 10. Thus, binary images of multiple cross sections are determined in the step (S8). One example of the determined binary image is shown in FIGS. 7A to 7D.

In the step (S9), determined binary images of multiple cross sections are supplied to the format converter 11 and each binary image is converted into an image of real sizes and into a format which can be processed by the modeling device 4. Thus, model data can be created.

In the step (S10), model data items of multiple cross sections are transmitted from the model data creating device 2 to the modeling device 4 via the communication device 3. When a portable medium such as a floppy disk is used as described before, advantages that the degree of freedom of selection of the place in which the modeling device 4 is installed increases and the modeling device 4 can be commonly used by a plurality of model data creating devices 2 can be attained.

Figure 8:
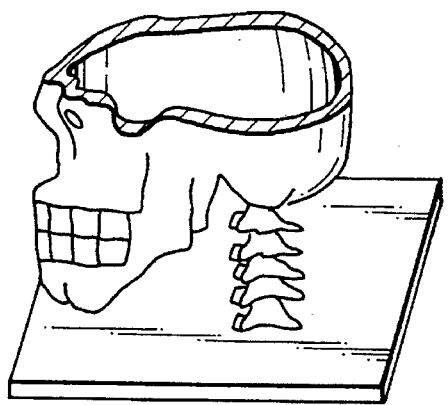
FIG. 8 is an external view of a three-dimensional model obtained on the half-way of the modeling process.
Figure 9:
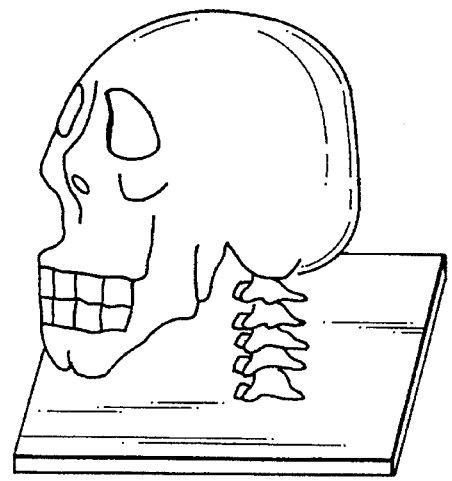
FIG. 9 is an external view of a completed three-dimensional model.

In the step (S11), model data items are sequentially used in an order from the lowermost layer towards the uppermost layer to repeatedly effect the curing operations for respective layers. As a result, a three-dimensional model is completed. FIG. 8 shows a three-dimensional model on the half-way of the model creating process and FIG. 9 shows a completed three-dimensional model.

As described above, according to this embodiment, a three-dimensional model can be formed by use of projection data collected by the projection data collecting device. The simulating operation for planning the surgical operation can be actually effected by use of the three-dimensional model. In the above explanation, model data items based on the determined binary images of multiple cross sections are transmitted to the modeling device 4 via the communication device 3, but projection data can be transmitted to the model data creating device 4 via the communication device 3 by replacing the model data creating device 2 and the communication device 3 with each other. If the communication device 3 is the portable medium, the transmission data is compressed in order to reduce the transmission data amount. If the device 1 is a helical scanning type, the projection data is transmitted in order to reduce the transmission data amount. In this case, the projection data is supplied to the re-construction processor 5 via the communication device 3. Further, in the above explanation, the three-dimensional model is formed on the base plate, but it is also possible to start formation of the three-dimensional model after the entire surface portion of the base plate is cured on a flat plate. In this case, an advantage that the positional relation between respective portions can be maintained even if portions of interest are discrete portions can be obtained, Next, a second embodiment is explained.

Figure 10:
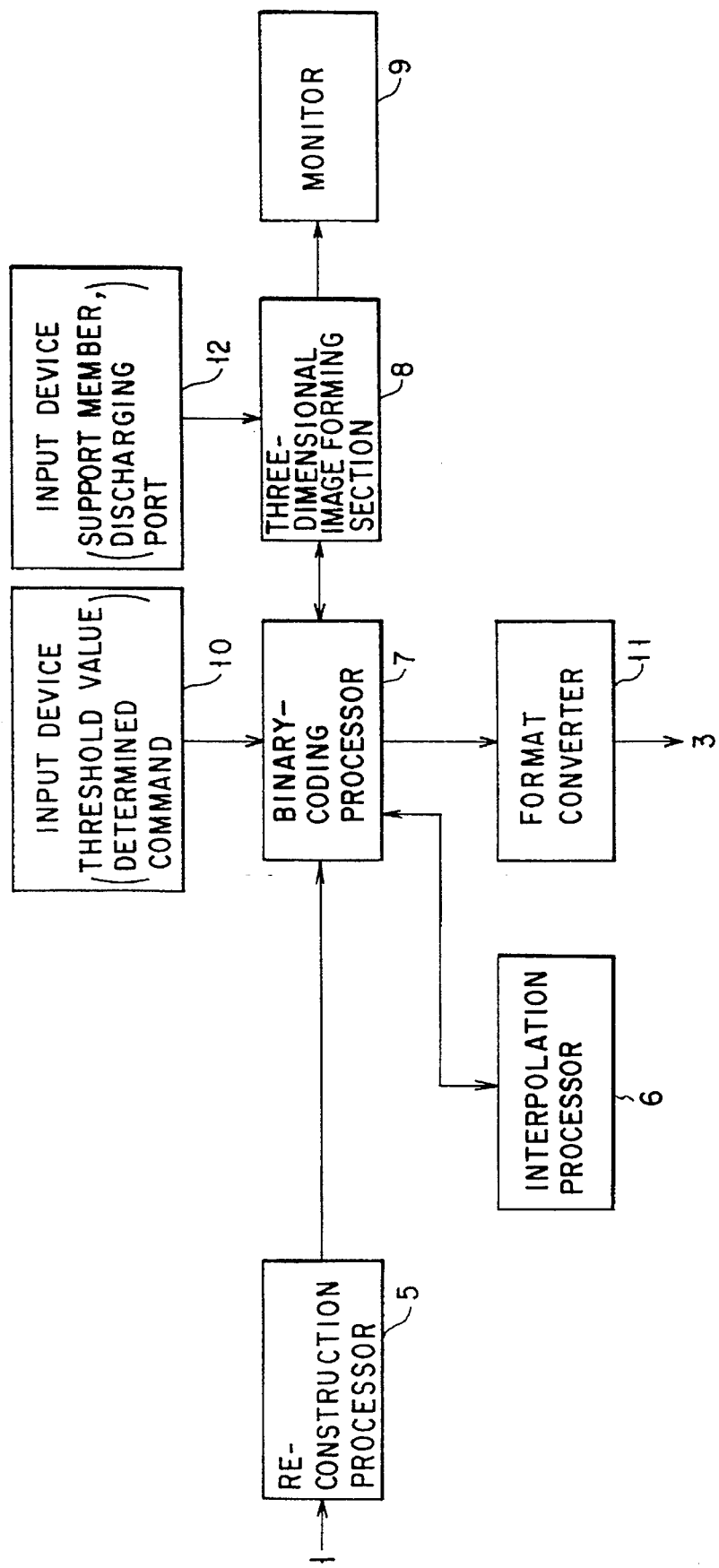
FIG. 10 is a block diagram showing a model data creating device of a three-dimensional model forming device according to a second embodiment.

The entire construction of a three-dimensional model forming device according to this embodiment is the same as that of the first embodiment shown in FIG. 1. FIG. 10 is a block diagram showing the construction of a model data creating device which is made to correspond to that of FIG. 4. Portions of FIG. 10 which are the same as those of FIG. 4 are denoted by the same reference numerals and the detail explanation therefor is omitted. In this embodiment, an input device 12 is connected to a three-dimensional image forming section 8. For example, the input device 12 is a mouse. A support member and a discharging port are added to the three-dimensional image in a desired position by operating the input device 12.

As described above, a modeling device 4 forms a three-dimensional model by sequentially laminating layers from the lower layer. Therefore, an isolated portion which is not formed continuously from the base plate 105 may be dropped on the half-way of the model forming process. In a space (closed space) surrounded by the cured portion, ultraviolet curing resin 101 remains. Therefore, it becomes necessary to add a support member to the three-dimensional model in position between the base plate 105 and the isolated portion and support the support member. Further, it is necessary to add a discharging port for discharging the ultraviolet curing resin 101 remaining in the space to the three-dimensional model.

That is, the input device 12 is an input device for adding the support member and discharging port on a three-dimensional image.

Next, the operation is explained.

FIG. 11 is a diagram corresponding to FIG. 5 and is a flowchart for illustrating the entire operation procedure from collection of projection data to formation of the three-dimensional model. Steps in FIG. 11 which are the same as those in FIG. 5 are denoted by the same reference numerals and the explanation therefor is omitted. A difference between the flowcharts of FIGS. 11 and 5 is that a new step (S12) is inserted between the steps (S7) and (S8). In the step (S12), a support member and discharging port are added on the three-dimensional image by operating the input device 12. That is, the operator checks whether an isolated portion or a space is present or not while observing the three-dimensional image displayed on the monitor 9 and inputs a support member and discharging port in adequate positions as required.

when the step (S12) is ended, the step (S8) is effected. That is, a determined command is input by operating the input device 10. As a result a binary image having the support member and discharging port added thereto can be determined. In the step (S9), model data containing the support member and discharging port is created and then the steps (S10) and (S11) are sequentially effected to complete a three-dimensional model having the support member and discharging port added thereto as shown in FIG. 12. In FIG. 12, the jaw portion is the isolated portion and the hatched portion is a space portion.

Thus, according to this embodiment, the isolated portion can be prevented from being dropped on the halfway of the model forming process and ultraviolet curing resin remaining in the space portion can be discharged. It is effective to inject colored gel into the space portion from which the ultraviolet curing resin has been discharged, or to be gritty a inwall of the space portion since the space portion can be recognized from the exterior through the resin 101 set into a semi-transparent cured state. In the above explanation, since the support member is attached only to a necessary portion, that is, isolated portion, the operation of adding the support member to the isolated portion while confirming the position of the support member is imposed on the operator. The operation can be easily alleviated by application of the following process. That is, a frame work such as a jungle gym obtained by combining a plurality of thin poles in a grid form is created together with a three-dimensional model and the three-dimensional model is formed inside the framework. Therefore, the isolated portion is supported by the framework and will not be dropped. The size and shape of the framework can be or not made common for all of the three-dimensional models.

Next, a third embodiment is explained.

The entire construction of a three-dimensional model forming device according to this embodiment is the same as that of the first embodiment shown in FIG. 1. FIG. 13 is a block diagram showing the construction of a model data creating device which is made to correspond to that of FIG. 10. The model data creating device of this embodiment is different from that of the second embodiment in that a support member/discharging port automatically adding section 13 is connected to a three-dimensional image forming section 8 and addition of the support member and discharging port can be automatically effected.

FIG. 14 is a block diagram of the support member/discharging port automatically adding section 13. An isolated portion detecting section 13 sequentially inputs a binary image from a three-dimensional image forming section 8 starting from the lower layer and detects an isolated portion based on the continuity of the image area (cured portion) extending from the lower layer to the upper layer. A support member adding section 14 adds a support member to the isolated portion detected by the isolated portion detecting section 13 and supplies the result of addition to the three-dimensional image forming section 8. A space detecting section 15 sequentially inputs a binary image from the three-dimensional image forming section 8 starting from the lower layer and detects a space based on the continuity of a background portion except the image portion (cured portion) extending from the lower layer to the upper layer. A discharging port adding section 16 adds a discharging port to the space detected by the space detecting section 15 and supplies the result of addition to the three-dimensional image forming section 8.

Figure 16A:
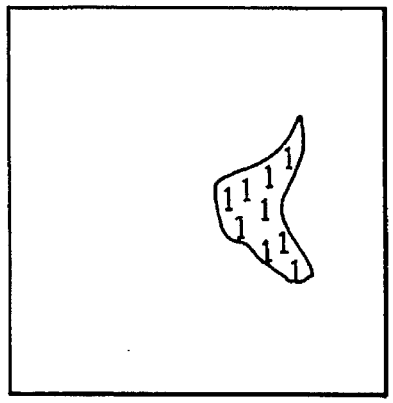
FIGS. 16A to 16C are supplementary diagrams for explaining the step (S41 of FIG. 15.
Figure 16B:
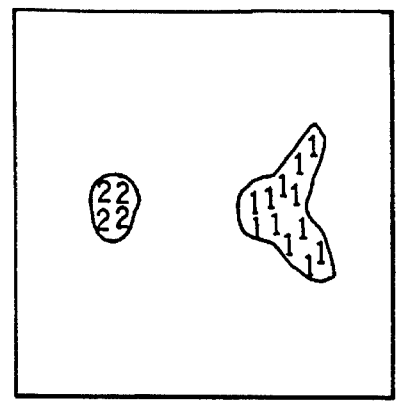

Next, the operation of this embodiment is explained. FIG. 15 is a flowchart for illustrating the procedure of detecting an isolated portion by use of the isolated portion detecting section 13. N indicates the number of binary images of multiple cross sections. In the step (S1), a parameter n is initially set to "1". The succeeding steps (S2) to (S6) are repeatedly effected for each of the binary images ranging from the binary image of the lowermost layer to the binary image of the uppermost layer. In the step (S2), a binary image of the (n)th layer from the lowermost layer is input from the three-dimensional image forming section 8 to the isolated portion detecting section 13. In the step (S3), an image area of the binary image is identified according to the distribution of pixel values of "1". In the step (S4), it is checked whether or not the image area of the (n)th binary image is continuous to the image area of an (n−1)th binary image in the Z direction (laminating direction) and the image area is numbered according to the continuity. The continuous image area is numbered to "1" and the discontinuous image area is numbered to "2". FIG. 16A shows an (n−1)th numbered image and FIG. 16B shows an (n)th numbered image.

In the step (S5), n is compared with N, and if n is equal to N, that is, if the (n)th binary image is a an image of the uppermost layer, the detection flow is completed, and if n is not equal to N, the step (S2) is effected after the step (S6) and the same process is effected for a binary image of the next layer.

Figure 16C:
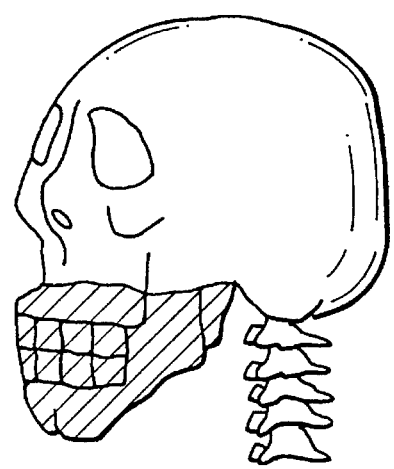

By the above procedure, an image area which is not continuous to the lowermost layer, that is, an isolated portion is numbered to "2". Thus, the isolated portion can be detected. In FIG. 16C, the isolated portion numbered to "2" is indicated by a hatched portion.

Position information of the thus detected isolated portion is supplied to the support member adding section 14. The support member adding section 14 adds a pole-like support member between the lowest portion of the isolated portion and the base plate. The shape and position information of the support member are supplied to the three-dimensional image forming section 8. Thus, a three-dimensional image containing the support member is displayed on the monitor 9.

FIG. 17 is a flowchart for illustrating the procedure of detecting a space by use of the space detecting section 15. N indicates the number of binary images of multiple cross sections. In the step (S1), a binary image of the lowermost layer (n=1) is input from the three-dimensional image forming section 8 to the space detecting section 15. In the step (S2), a plurality of background areas contained in the binary image of the lowermost layer are identified according to the distribution of pixel values of "0". The background areas are areas divided by the image area. In the step (S3), the background areas are sequentially numbered to different numerals starting from "1". Particularly, the largest background area is numbered to "1". Thus, the process for the binary image of the lowermost layer is completed.

Figure 18A:
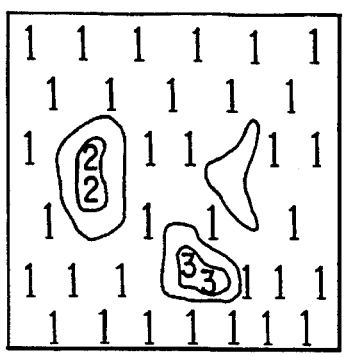
FIGS. 18A to 18D are supplementary diagrams for explaining the step (S7) of FIG. 17.
Figure 18B:
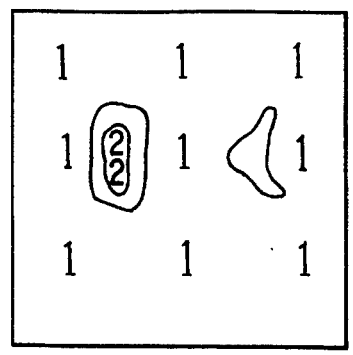
Figure 18C:
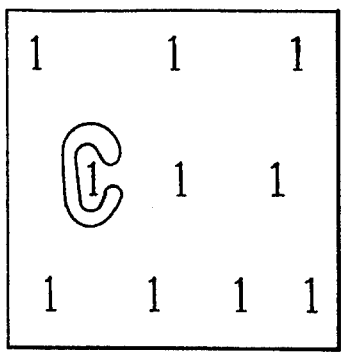

A sequence of processes from the step (S4) to the step (S8) is repeatedly effected for each of the binary images ranging from the binary image of a layer next to the lowermost layer to a binary image of the uppermost layer. In the step (S4), the parameter n is counted up by 1. In the step (S5), a binary image of the (n)th layer from the lowermost layer is input from the three-dimensional image forming section 8 to the space detecting section 15. Like the step (S2), in the step (S6), a plurality of background areas contained in the binary image is identified according to the distribution of pixel values of "0". In the step (S7), it is checked whether or not each background area of the (n)th binary image is continuous to any one of the background areas of an (n−1)th binary image in the Z direction (laminating direction) and the background area is numbered according to the continuity. FIG. 18A shows an (n)th numbered image and FIG. 18B shows an (n−1)th numbered image. If one of the background areas contained in the (n)th binary image is connected to one of the background areas contained in the (n−1)th binary image, the corresponding background area contained in the (n)th binary image is numbered to the same number as that which is given to the corresponding background area contained in the (n−1)th binary image. If one of the background areas contained in the (n)th binary image is not connected to any one of the background areas contained in the (n)th binary image, the corresponding background area contained in the (n)th binary image is numbered to a new number. If the background area of the (n)th binary image which is connected to the background area of the (n−1)th binary image which is numbered to a number other than "1" is combined with a large background area of the binary image as shown in FIG. 18C, the corresponding background area is numbered to "1" of the large background area and the numbers of all of the background areas of the lower layer connected to the corresponding background area are changed to "1".

Figure 18D:
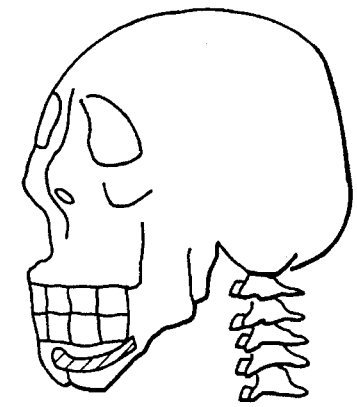

By the above process, the background area which is not combined with the large background area, that is, a space is numbered to a number equal to or larger than "2". Therefore, an area which is numbered to a number equal to or larger than "2" is detected as a space. In FIG. 18D, the space is indicated by a hatched portion.

Position information of the thus detected space is supplied to the space adding section 16. The space adding section 16 adds a discharging port with a predetermined diameter to the space. The shape and position information of the space are supplied to the three-dimensional image forming section 8. Thus, a three-dimensional image containing the space is displayed on the monitor 9.

Thus, according to this embodiment, the same effect as that of the second embodiment can be obtained and the operation by the operator for operating the input device to add the support member and discharging port can be omitted.

Next, a fourth embodiment is explained.

Figure 19:
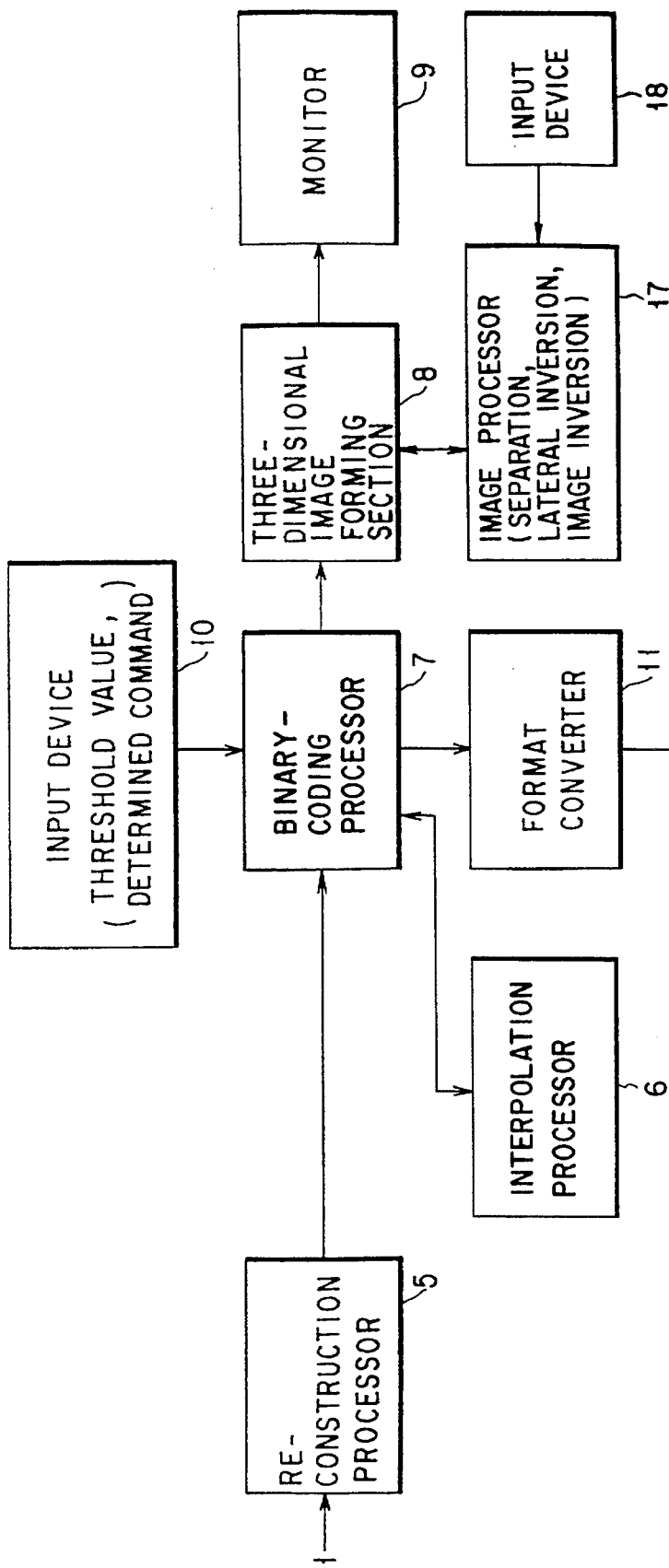
FIG. 19 is a block diagram showing a model data creating device of a three-dimensional model forming device according to a fourth embodiment.

The entire construction of the three-dimensional model forming device according to this embodiment is the same as that of the first embodiment shown in FIG. 1. FIG. 19 is a block diagram showing the construction of the three-dimensional model forming device which is made to correspond to the construction of FIG. 4. Portions of 10 FIG. 19 which are the same as those of FIG. 4 are denoted by the same reference numerals and the explanation therefor is omitted. An image processor 17 is connected to a three-dimensional image forming section 8. The image processor 17 is connected to an input device 18. A three-dimensional image formed by the three-dimensional image forming section 8 is supplied to the image processor 17 and subjected to various image processes. A three-dimensional model is formed based on the three-dimensional image thus formed by the various image processes. As one example of the image process, a label adding process, separation process, re-arrangement process, lateral inversion process, and reversal of black and white are proposed. The three-dimensional models formed based on the results of the respective processes may have inherent clinical advantages.

Figure 20:
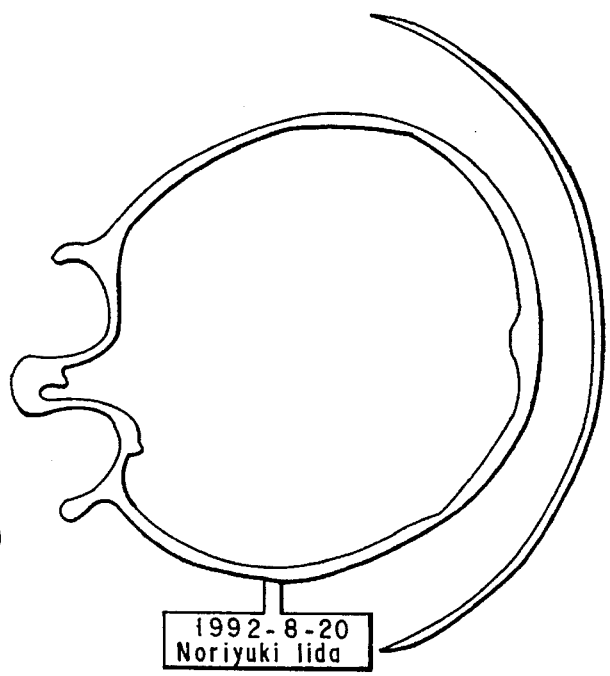
FIG. 20 is a diagram showing a binary image having a label added thereto by an image processor of FIG. 19.

First, the label adding process is explained. Selection of the label adding process is effected by use of the input device 18. The label is a card which is attached to a formed three-dimensional model and on which the photographing date and the name of a patient are written. The label is attached to a binary image, for example, binary image of the lowermost layer as shown in FIG. 20. Thus, the label on which the photographing date and the name off a patient are written is attached to the bottom portion of the formed three-dimensional model. Therefore, the three-dimensional model can be easily identified.

Figure 21A:
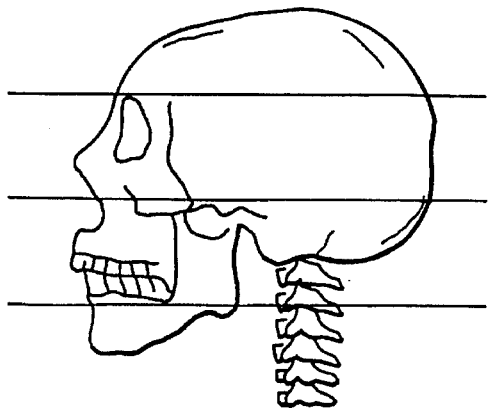
FIGS. 21A and 21B are supplementary diagrams for explaining the separation process by the image processor of FIG. 19.
Figure 21B:
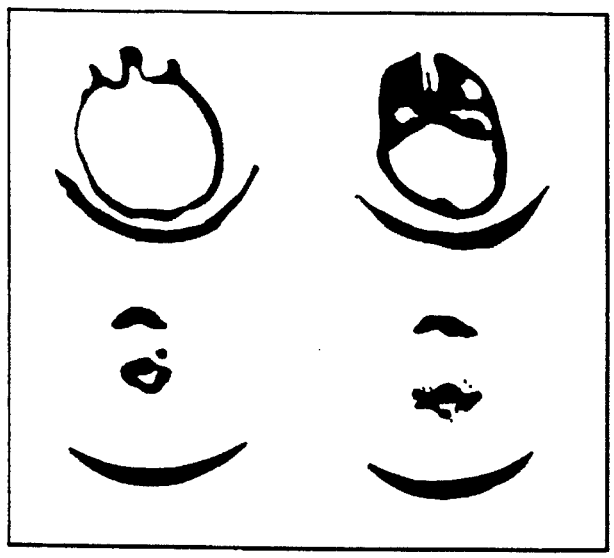
Figure 22:
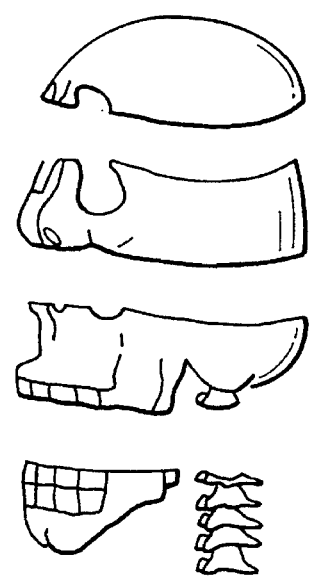
FIG. 22 is an external view of a three-dimensional model modeled by the separation process.

Next, the separation process is explained. Selection of the separation process is effected by use of the input device 18. As shown in FIG. 21A, by operating the input device 18, a plurality of separation planes, in this example, three separation planes which are discrete in the cross sectional direction are set in parallel to one another at a regular interval. Binary images of multiple cross sections are divided into four groups each including the same number of binary images by the separation planes. The binary-coding processor 7 extracts one binary image from each of the four groups. The four binary images are discretely arranged in one frame as shown in FIG. 21B by the binary-coding processor 7. The position of the arrangement is inherent to each group. The new binary image thus obtained is transmitted to the communication device 3 via a format converter 11 and then supplied to the modeling device 4. In the modeling device 4, the laminating operation is repeatedly effected according to the new binary image. Thus, the three-dimensional models of the respective portions separated by the separation planes are simultaneously formed. The three-dimensional models of the respective portions are shown in FIG. 22. The three-dimensional models of the respective portions are finally bonded together to complete the three-dimensional model of a scull in a combined form. The separation process contributes to reduction in the model forming time.

The re-arrangement process is explained. Selection of the re-arrangement process is effected by use of the input device 18. By operating the input device 18, binary images of multiple cross sections of a plurality of patients which are simultaneously formed are held in the binary-coding processor 7. Binary images of different patients are discretely re-arranged in the same frame for each binary image. The position of the re-arrangement is inherent to the patient. New binary images thus obtained are transmitted to the communication device 3 via the format converter 11 and then supplied to the modeling device 4. In the modeling device 4, the laminating operation is repeatedly effected according to the new binary images. Thus, three-dimensional models of different patients are simultaneously formed. Like the separation process, the re-arrangement process contributes to reduction in the model forming time.

Figure 23A:
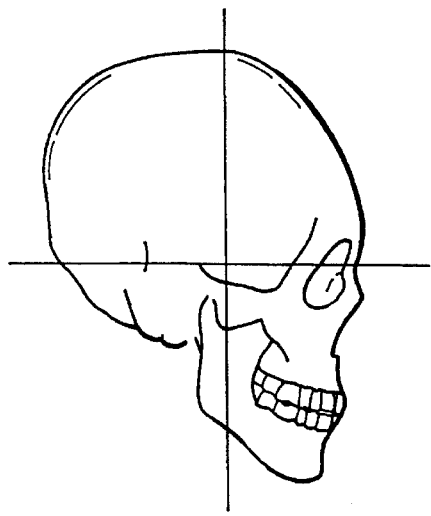
FIGS. 23A to 23E are supplementary diagrams for explaining another separation process by the image processor.
Figure 23B:
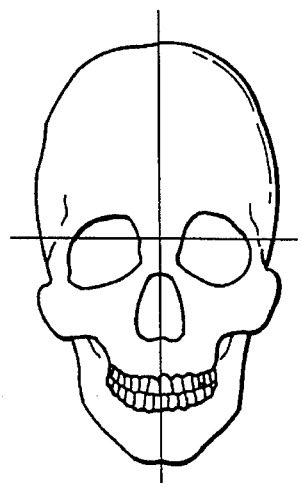
Figure 23C:
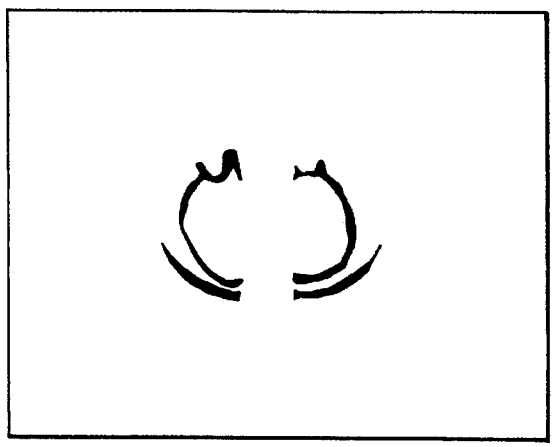
Figure 23D:
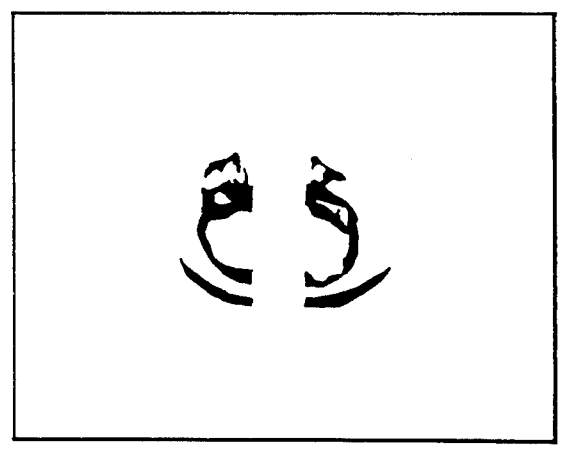
Figure 23E:
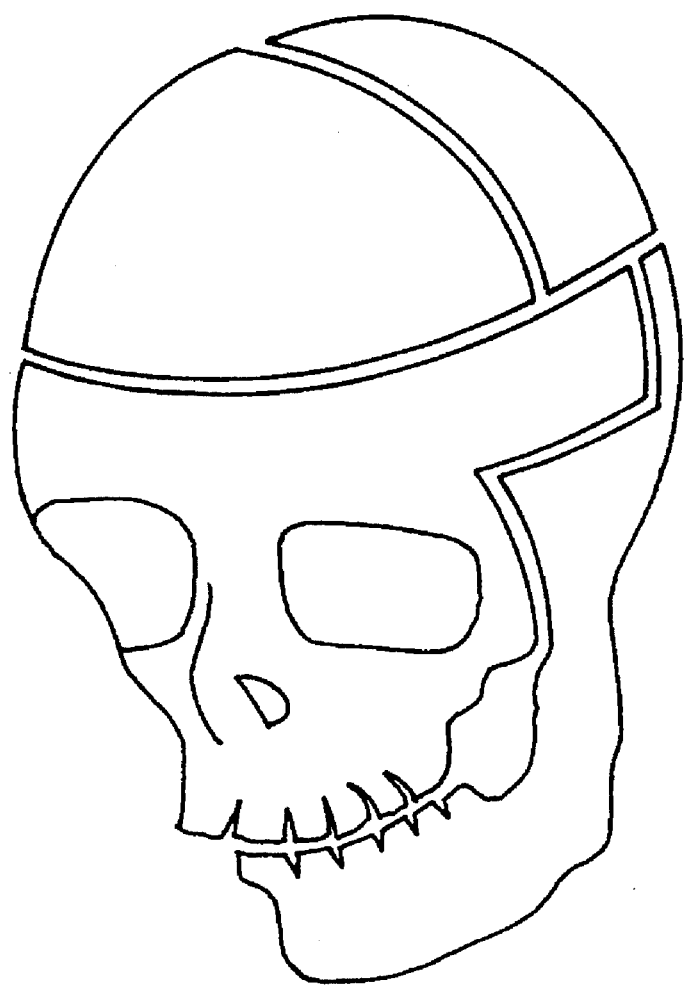

Next, the other separation process is explained. Selection of the other separation process is effected by use of the input device 18. By operating the input device 18, a separation plane is set in a desired position. It is desirable to set the separation plane in one of the axial plane, sagittal plane and coronal plane as shown in FIGS. 2BA and 23B. Binary images of multiple cross sections are divided into two groups each including the same number of binary images by the separation planes. The binary-coding processor 7 extracts a binary image from each of the groups. The four binary images are discretely arranged in one frame as shown in FIGS. 2BC and 2BD by the binary-coding processor 7. The position off the arrangement is inherent to each group. New binary images thus obtained are transmitted to the communication device 3 via the format converter 11 and then supplied to the modeling device 4. In the modeling device 4, the laminating operation is repeatedly effected according to the new binary images. Three-dimensional models of the respective portions separated by the separation plane are simultaneously formed. The three-dimensional models of the respective portions are shown in FIG. 24. Cross sections obtained by cutting the scull along the axial plane, sagittal plane or coronal plane may be observed from the three-dimensional models. The cross section can be effectively used when a place in which the scull is cut is specified. Further separated models as shown in FIG. 23E, which are separated along cutting planes of a practical operation, are formed by setting separation planes at desired potion.

Next, the lateral inversion process is explained. The image processor 17 laterally inverts the binary image with respect to the axial plane. The laterally inverted binary image is transmitted to the communication device 3 via the format converter 11 and then supplied to the modeling device 4. In the modeling device 4, a three-dimensional model is formed according to the laterally inverted binary image. FIG. 25A shows a three-dimensional model which is not laterally inverted and FIG. 25B shows a laterally inverted three-dimensional mode. The human body is generally symmetrical on the right and left portions. For example, if the scull is partly defective, a repairing member (artificial bone) for filling the defective portion is required. A preferable artificial bone can be made by forming a repairing member as shown in FIG. 25C by using part of a defective portion cut out from the laterally inverted three-dimensional model as a basic pattern. Formation of only part of the defective portion can be easily attained by subtracting the three-dimensional image which is not laterally inverted from the laterally inverted three-dimensional image.

In addition, by effecting various other image processes, three-dimensional models with various clinical advantages can be formed.

Next, a fifth embodiment is explained.

Figure 26:
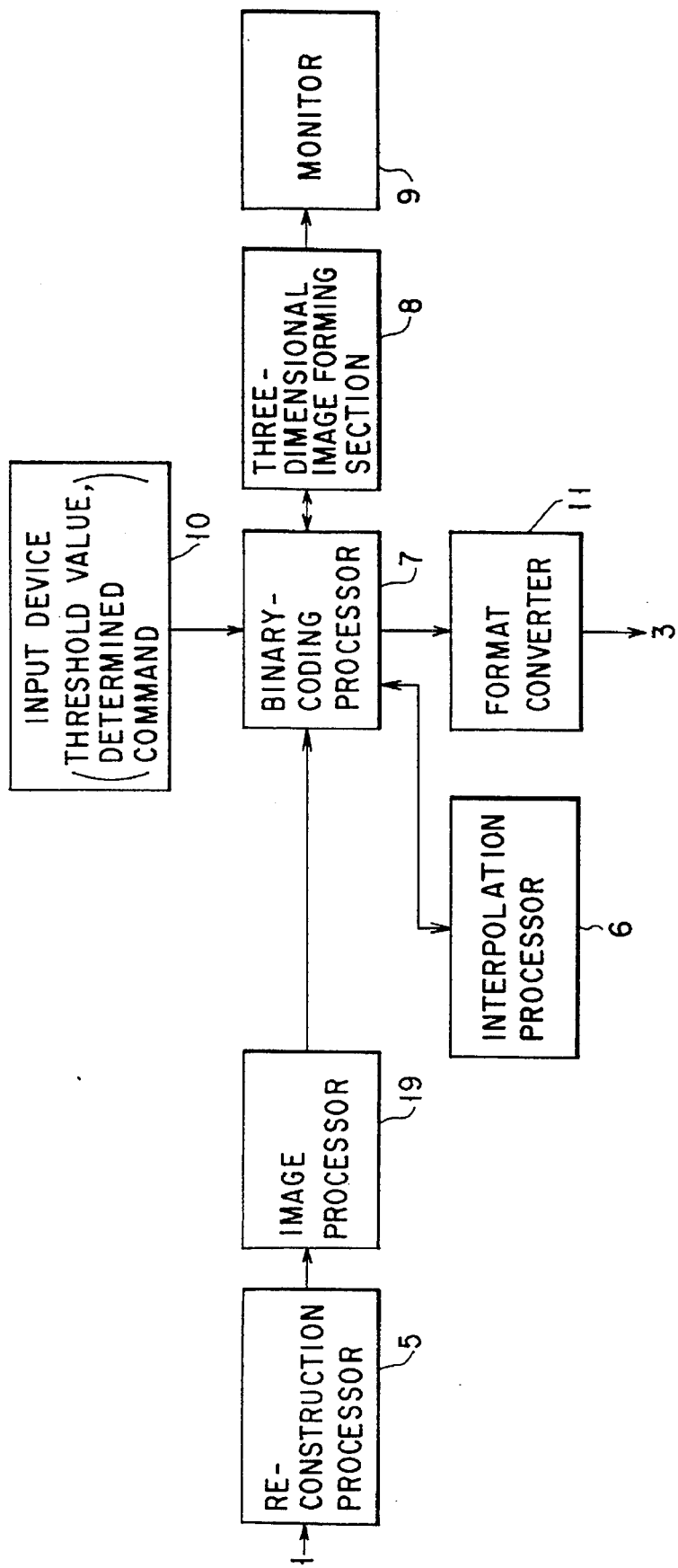
FIG. 26 is a block diagram showing a model data creating device of a three-dimensional model forming device according to a fifth embodiment.

The entire construction of the three-dimensional model forming device according to this embodiment is the same as that of the first embodiment shown in FIG. 1. FIG. 26 is a block diagram showing the construction of a model data forming device which is made to correspond to that of FIG. 4. Portions of FIG. 26 which are the same as those of FIG. 4 are denoted by the same reference numerals and the detail explanation thereof is omitted. An image processor 19 is provided between a re-construction processor 5 and an binary-coding processor 7. The image processor 19 extracts a specified area from a light-and-shade image (tomographic image) formed by the re-construction processor 5 according to a threshold value inherent thereto. As the extracted area, a blood vessel, bone and tumor may be considered. In this example, it is assumed to extract a blood vessel. FIG. 27A shows a tomographic image of the lung and FIG. 27B shows a blood vessel image extracted from the tomographic image. In the image processor 19, the blood vessel image is subtracted from the tomographic image. The image by subtraction is supplied to the binary-coding processor 7 and is binary-coded into a background area and an image area. FIG. 27C shows a binary image. The same process is repeatedly effected for all of the tomographic images. The binary images are transmitted to the communication device 3 via the format converter 11 and then supplied to the modeling device 4. In the modeling device 4, a three-dimensional model is formed according to the binary images. FIG. 27D shows a completed three-dimensional model. Broken lines indicate spaces. That is, in the three-dimensional model, a specified area extracted by the image processor 19, in this example, a blood vessel is formed in the cavity. By injecting colored gel into the cavity, the running condition of the blood vessel can be observed from the exterior. It is impossible to form the blood vessel since the blood vessel is thin and runs in a complicated manner. By forming the three-dimensional model in which the blood vessel is formed as a cavity as in this embodiment, the desired purpose of observing the running condition of the blood vessel can be achieved.

This invention is not limited to the above embodiments and can be be variously modified without departing from the technical scope thereof.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A three-dimensional model forming device comprising:

re-constructing means for re-constructing tomographic image data of multiple cross sections based on a plurality of projection data items covering a three-dimensional area of an object;

threshold value setting means for setting a threshold value to establish a solid level in a tomographic image;

binary coding means for converting the tomographic image data of multiple cross sections into binary image data of multiple cross sections based on the set threshold value so as to extract image data for a specific region;

constructing means for constructing a three-dimensional image data based on the binary image data of multiple cross sections;

display means for displaying a three-dimensional images as an artist concept of a three-dimensional model;

threshold value changing means for changing the set threshold value so that a desired region is extracted; and model forming means for forming a three-dimensional model of the desired resin by hardening liquid region based on the binary image data of multiple cross sections.

2. A three-dimensional model forming device according to claim 1, further comprising transmitting means for transmitting the binary image data of multiple cross sections from said converting means to said model forming means.

3. A three-dimensional model forming device according to claim 2, in which said transmitting means is portable storage medium for storing the binary images of multiple cross sections.

4. A three-dimensional model forming device according to claim 2, in which said transmitting means transmits the binary image data of multiple cross sections via a communication medium.

5. A three-dimensional model forming device according to claim 1, in which said changing means changes the threshold value for every layer.

6. A three-dimensional model forming device according to claim 1, further comprising means for detecting an inside-background area surrounded by an image area contained in said binary image data; and means for inputting a loophole data, which couples the inside-background area to an outside-background area, for discharging the resin remaining in the three-dimensional model to the binary image data.

7. A three-dimensional model forming device according to claim 6, in which said detecting means detects said inside-background area based on the continuity of a background area from a lower layer to an upper layer.

8. A three-dimensional model forming device according to claim 1, in which said model forming means hardens the resin, layer by layer, by sequentially using the binary image data of multiple cross sections from the lower layer to the upper layer.

9. A three-dimensional model forming device according to claim 8, in which said model forming means includes means for generating a pin-point ultraviolet laser beam, means for controlling generation and interruption of the ultraviolet laser beam by said generating means according to a variation in level attained by scanning the binary image data of multiple cross sections, means for scanning the ultraviolet laser beam from said generating means onto the liquid surface of the resin which is hardened in response to application of ultraviolet light, and means for sequentially lowering a hardened layer at a preset pitch.

10. A three-dimensional model forming device according to claim 8, in which said reconstructing means reconstructs the tomographic image data of multiple cross sections with a pitch correspond to said preset thickness.

11. A three-dimensional model forming device according to claim 8, further comprising means for interpolating the tomographic image data of multiple cross sections to correspond the pitch of the tomographic image data to said preset thickness.

12. A three-dimensional model forming device according to claim 1, in which said model forming means includes means for supplying a heat melting liquid resin, which hardens in response to temperature-falling, on a base plate, means for controlling supply an interruption of the heat melting liquid resin by said supplying means according to a variation in data level attained by scanning the binary image data, means for moving relativity said supplying means and said base plate, and means for sequentially lowering said base plate at a preset pitch.

13. A three-dimensional model forming device according to claim 1, further comprising means for exchanging left-side image data and right-side image data for each layer of the binary image data, means for subtracting the exchanged image data and a corresponding layer binary image data, and means for supplying subtracted image data to said model forming means to form the three-dimensional model of a part differing left-side and right-side.

14. A three-dimensional model forming device comprising:

means for inputting a three-dimensional image data of an object;

threshold value setting means for setting a threshold value to establish a solid level in said three dimensional image data;

converting means for converting the three-dimensional image data into binary image data based on the threshold value to extract an image data of a specific region;

constructing means for constructing a three-dimensional binary image data based on the binary image data of multiple cross sections;

display means for displaying a three-dimensional image as an artist concept of a three-dimensional model based on the three-dimensional binary image data;

threshold value changing means for changing the threshold value so that a desired region is extracted;

means for detecting an isolated area, which is an image area non-overlapping on an image area of a lower layer, contained in said binary image data;

support member data adding means for inputting a support member data overlapping the isolated area on the image area of the lower layer to said binary image data;

means for making a modeling data based on said binary image data added to said support member data; and means for forming a three-dimensional model of the specific region by hardening liquid resin based on said modeling data.

15. A three-dimensional model forming device according to claim 14, in which said detecting means detects an isolated area based on the continuity of an image area from a lower layer to an upper layer in said binary image data.

16. A three-dimensional model forming device comprising:

means for inputting three-dimensional image data of an object;

means for setting threshold values which are indicative of solid levels in said three-dimensional image data;

means for dividing a plurality of groups of said three-dimensional image data according to a plurality of blocks of the object, including binary coding means for converting the three-dimensional image data into binary image data based on the threshold values set by said setting means for each of said groups; and means for forming separately a plurality of three-dimensional models corresponding to a plurality of blocks of the object based on each of groups of said three-dimensional image data.

17. A three-dimensional model forming device according to claim 16, in which said dividing means divides said three-dimensional image data so that the three-dimensional models separated into multiple are formed.

18. A three-dimensional model forming device comprising:

means for inputting tomographic image data of multiple cross sections;

means for setting a threshold value indicative of solid and non-solid areas in said image data;

binary coding means for converting the tomographic image data of multiple cross sections into binary image data of multiple cross sections based on the set threshold value so as to extract image data for a specific region;

means for exchanging left-side binary image data and right-side binary image data for each binary image cross section; and means for forming a three-dimensional model replaced left-side and right-side by hardening liquid resin based on said exchanged binary image data.

19. A three-dimensional model forming device comprising:

means for inputting tomographic image data of multiple cross sections;

means for setting threshold values which are indicative of solid levels in said tomographic image data of multiple cross sections;

binary coding means for converting the tomographic image data of multiple cross sections into binary image data, including image area data and background area data, of multiple cross sections based on the set threshold value so as to extract image data for a specific region;

means for forming modeling image data by inverting the image area data and the background area data of the binary image data for each cross section of the tomographic image data; and means for forming a three-dimensional model by curing liquid resin based on said modeling image data formed by inverting the image area data with the background area data.

20. A method of forming a three-dimensional model comprising the step of:

reconstructing tomographic image data of multiple cross sections based on a plurality of projection data items covering a three-dimensional area of an object;

converting the tomographic image data of multiple cross sections into binary image data of multiple cross sections based on a threshold value to extract an image of a specific region;

constructing a three-dimensional image data based on the binary image data of multiple cross sections;

displaying the three-dimensional image as an artist concept of a three-dimensional model;

changing the threshold value so that a desired region is extracted; and model-forming a three-dimensional model of the desired region by hardening liquid resin based on the binary image data of multiple cross sections.

21. A method according to claim 20, further comprising a step of detecting an isolated area, which is an image area non-overlapping on image area of a lower layer, contained in the three-dimensional image and a step of inputting a support member data overlapping the isolated area on the image area of a lower layer to the binary image data.

22. A method according to claim 20, further comprising a step of detecting an inside-background area surrounded by an image area in the binary image data and inputting loophole data, which couples the inside-background area to an outside-background area, for discharging the liquid resin remaining in the three-dimensional model in relation to the binary image data.

23. A method according to claim 22, in which said detecting step detects based on the continuity of an image area from a lower layer to an upper layer.

24. A method according to claim 20, in which said model forming step hardens the resin layer by layer by sequentially using the binary image data of multiple cross sections from the lower layer to the upper layer.

25. A method according to claim 20, in which said model forming step comprises sequentially scanning a pin-point ultraviolet laser beam onto a liquid surface of the resin which is hardened in response to application of the ultraviolet light, lowering a hardened layer so that the lowered hardened layer is covered by liquid resin, and scanning the liquid resin on the lowered hardened layer with said pin-point ultraviolet laser beam to produce a next hardened resin layer on said lowered hardened resin layer.

26. A method according to claim 25, in which said re-constructing step re-constructs the tomographic image data of multiple cross sections at said preset pitch.

27. A method according to claim 25, in which said forming step includes a step of interpolating the tomographic image data of multiple cross sections to correspond the pitch of the tomographic image data to said preset thickness.

28. A method according to claim 20, further comprising dividing step for dividing the binary image data into a plurality of groups so that a plurality of respective separated three-dimensional models are formed.

29. A method according to claim 20, in which said dividing step divides the binary image data of multiple cross sections into a plurality of groups in a cross-sectional direction.

30. A method of forming a three-dimensional model comprising the steps of:

inputting tomographic image data of multiple cross sections;

setting threshold values which are indicative of solid levels in said tomographic image data of multiple cross sections;

converting the tomographic image data of multiple cross sections into binary image data, including left-side image data and right-side image data, of multiple cross sections based on the set threshold value so as to extract said left-side and right-side image data for a specific region;

exchanging the left-side image data and right-side image data for each cross section of the binary image data of multiple cross sections; and forming a three-dimensional model by hardening liquid resin based on said binary image data which has had the left-side image data and the right-side image data exchanged in said exchanging step.

31. A method according to claim 20, further comprising a subtracting step which subtracts the exchanged binary image data and the binary image data to form the three-dimensional model of a part based on a difference between the left-side and right-side image data.

32. A method of forming a three-dimensional model comprising the steps of:

inputting tomographic image data of multiple cross sections;

setting threshold values which are indicative of solid levels in said tomographic image data of multiple cross sections;

converting the tomographic image data of multiple cross sections into binary image data, including image area data and background area data, of multiple cross sections based on the set threshold value so as to extract image data for a specific region;

inverting the image area data and the background area data for each cross section of said binary image data of the multiple cross sections; and forming a three-dimensional model of a background portion by hardening liquid resin based on each cross section of said binary data which has had inverted the image area data and the background area data.

33. A method of forming a three-dimensional model comprising the steps of:

converting the tomographic image data of multiple cross sections into binary image data of multiple cross sections based on a threshold value to extract an image of a specific region;

constructing a three-dimensional image data based on binary image data of multiple cross sections;

displaying said three-dimensional image data as an artist concept of a three-dimensional model;

changing a threshold value so that a desired region is extracted;

inputting a decision command; and forming a three-dimensional model of the desired region based on said binary image data.

* * * * *